United States Patent
Nichol

(10) Patent No.: US 10,575,623 B2
(45) Date of Patent: Mar. 3, 2020

(54) COLOR CAPTURE SYSTEM AND DEVICE

(71) Applicant: Sephora USA, Inc., San Francisco, CA (US)

(72) Inventor: Jamie G. Nichol, Carlisle, MA (US)

(73) Assignee: Sephora USA, Inc., San Francisco, CA (US)

( * ) Notice: Subject to any disclaimer, the term of this patent is extended or adjusted under 35 U.S.C. 154(b) by 0 days.

(21) Appl. No.: 16/023,854

(22) Filed: Jun. 29, 2018

(65) Prior Publication Data

US 2020/0000206 A1    Jan. 2, 2020

(51) Int. Cl.

| | |
|---|---|
| *A45D 44/00* | (2006.01) |
| *G01J 1/46* | (2006.01) |
| *G01J 1/08* | (2006.01) |
| *H05B 37/02* | (2006.01) |
| *H05B 33/08* | (2006.01) |
| *H04B 1/02* | (2006.01) |
| *G01J 1/44* | (2006.01) |
| *H01Q 7/00* | (2006.01) |

(52) U.S. Cl.
CPC .............. *A45D 44/005* (2013.01); *G01J 1/08* (2013.01); *G01J 1/46* (2013.01); *H04B 1/02* (2013.01); *H05B 33/0872* (2013.01); *H05B 37/0281* (2013.01); *A45D 2044/007* (2013.01); *G01J 2001/4406* (2013.01); *G01J 2001/446* (2013.01); *G01J 2001/4473* (2013.01); *H01Q 7/00* (2013.01)

(58) Field of Classification Search
CPC . A45D 44/005; G01J 1/08; G01J 1/46; H04B 1/02; H05B 33/0872; H05B 37/0281
USPC ................................................ 455/41.1–41.3
See application file for complete search history.

(56) References Cited

U.S. PATENT DOCUMENTS

| | | |
|---|---|---|
| 3,370,754 A | 2/1968 | Cook et al. |
| 3,739,947 A | 6/1973 | Baumann et al. |
| 4,651,262 A | 3/1987 | Piironen |
| 4,988,503 A | 1/1991 | Macchio et al. |
| 5,094,276 A | 3/1992 | Caputo et al. |
| 5,163,010 A | 11/1992 | Klein et al. |
| 5,198,875 A | 3/1993 | Bazin et al. |
| 5,316,712 A | 5/1994 | Ono et al. |
| 5,520,203 A | 5/1996 | Segerstrom |
| 5,537,211 A | 7/1996 | Dial |
| 5,598,843 A | 2/1997 | Caisey et al. |

(Continued)

FOREIGN PATENT DOCUMENTS

| | | |
|---|---|---|
| CA | 2 400 748 A1 | 10/2001 |
| CA | 2 461 307 C | 4/2003 |

(Continued)

OTHER PUBLICATIONS

Paul Marks, Magnetic Messages Let Smartphones Receive Secret Data, NewScientist, Jul. 3, 2014.

*Primary Examiner* — Edward F Urban
*Assistant Examiner* — Rui M Hu
(74) *Attorney, Agent, or Firm* — Van Pelt, Yi & James LLP

(57) ABSTRACT

Exemplary embodiments provide a simple, inexpensive, and easy-to-operate color capture device that can capture color information and transmit the captured color information to an interface device such as smartphone, where the captured color information is optionally processed and is then transmitted to a remote server for subsequent production of the customized cosmetic.

19 Claims, 15 Drawing Sheets

(56) References Cited

U.S. PATENT DOCUMENTS

| | | | |
|---|---|---|---|
| 5,622,692 A | 4/1997 | Rigg et al. | |
| 5,636,637 A | 6/1997 | Guiolet et al. | |
| 5,800,816 A | 9/1998 | Brieva et al. | |
| 5,903,465 A | 5/1999 | Brown | |
| 5,929,999 A * | 7/1999 | Butterworth | G01J 3/10 250/226 |
| 5,945,112 A | 8/1999 | Flynn et al. | |
| 5,965,112 A | 10/1999 | Brieva et al. | |
| 5,992,705 A | 11/1999 | Lhuisset | |
| 6,177,093 B1 | 1/2001 | Lombardi et al. | |
| 6,284,228 B1 | 9/2001 | Markowitz et al. | |
| 6,338,349 B1 | 1/2002 | Robinson et al. | |
| 6,402,364 B1 | 6/2002 | Esclar et al. | |
| 6,412,658 B1 | 7/2002 | Bartholomew et al. | |
| D461,080 S | 8/2002 | Bartholomew et al. | |
| 6,437,866 B1 | 8/2002 | Flynn | |
| D465,810 S | 11/2002 | Bartholomew et al. | |
| 6,510,366 B1 | 1/2003 | Murray et al. | |
| 6,516,245 B1 | 2/2003 | Dirksing et al. | |
| 6,603,550 B1 | 8/2003 | Flynn et al. | |
| 6,615,881 B2 | 9/2003 | Bartholomew et al. | |
| 6,622,064 B2 | 9/2003 | Bartholomew et al. | |
| 6,655,551 B2 | 12/2003 | Manne | |
| D485,310 S | 1/2004 | Bartholomew et al. | |
| 6,672,341 B2 | 1/2004 | Bartholomew et al. | |
| 6,779,686 B2 | 8/2004 | Bartholomew et al. | |
| 6,807,297 B1 | 10/2004 | Tankovich et al. | |
| D500,804 S | 1/2005 | Bartholomew et al. | |
| 6,883,561 B2 | 4/2005 | Bartholomew et al. | |
| 6,935,386 B2 | 8/2005 | Miller et al. | |
| D513,040 S | 12/2005 | Bartholomew et al. | |
| 7,064,832 B2 * | 6/2006 | Rogers | G01J 1/42 250/226 |
| 7,082,970 B2 | 8/2006 | Bartholomew et al. | |
| 7,090,740 B2 | 8/2006 | Dronzek | |
| 7,099,740 B2 | 8/2006 | Bartholomew et al. | |
| 7,119,930 B1 | 10/2006 | Carstensen et al. | |
| 7,121,429 B2 | 10/2006 | Bartholomew et al. | |
| 7,151,851 B2 | 12/2006 | Ladjevardi | |
| 7,174,310 B2 | 2/2007 | Bartholomew et al. | |
| 7,206,664 B2 | 4/2007 | Schmid | |
| 7,394,538 B2 | 7/2008 | Bazin | |
| 7,395,134 B2 | 7/2008 | Bartholomew et al. | |
| 7,445,372 B1 | 11/2008 | Engel et al. | |
| 7,475,710 B2 | 1/2009 | Bartholomew et al. | |
| 7,517,571 B2 | 4/2009 | Funke et al. | |
| 7,522,768 B2 | 4/2009 | Bhatti et al. | |
| 7,522,769 B2 | 4/2009 | Harville et al. | |
| 7,522,825 B2 | 4/2009 | Kenet | |
| 7,624,769 B2 | 12/2009 | Bartholomew et al. | |
| 7,721,978 B2 | 5/2010 | Chevalier | |
| 7,822,504 B2 | 10/2010 | Bartholomew et al. | |
| 7,972,266 B2 | 7/2011 | Gobeyn et al. | |
| 8,017,137 B2 | 9/2011 | Bartholomew et al. | |
| 8,026,942 B2 | 9/2011 | Payonk et al. | |
| 8,141,596 B2 | 3/2012 | Bartholomew et al. | |
| 8,186,872 B2 | 5/2012 | Bartholomew et al. | |
| 8,238,623 B2 | 8/2012 | Stephan et al. | |
| 8,351,038 B2 | 1/2013 | Carroll et al. | |
| 8,352,070 B2 | 1/2013 | Bartholomew et al. | |
| 8,358,348 B2 | 1/2013 | Mohammadi et al. | |
| 8,437,540 B2 | 5/2013 | Stephan et al. | |
| 8,527,365 B2 | 9/2013 | Pak | |
| 8,532,736 B1 | 9/2013 | Malzbender et al. | |
| 8,564,778 B1 | 10/2013 | Igarashi | |
| 8,573,263 B2 | 11/2013 | Bartholomew et al. | |
| 8,593,634 B1 | 11/2013 | Igarashi | |
| 8,596,498 B2 | 12/2013 | Werner et al. | |
| 8,608,371 B2 | 12/2013 | Bartholomew et al. | |
| 8,636,173 B2 | 1/2014 | Bartholomew et al. | |
| 8,640,432 B2 | 2/2014 | Rodrigues | |
| 8,666,540 B2 | 3/2014 | Milhorn | |
| 8,693,768 B1 | 4/2014 | LaForgia | |
| 8,695,610 B2 | 4/2014 | Samain et al. | |
| 8,702,772 B2 | 4/2014 | Luzon et al. | |
| 8,709,003 B2 | 4/2014 | Island et al. | |
| 8,830,467 B2 | 9/2014 | Igarashi | |
| 8,830,468 B2 | 9/2014 | Igarashi | |
| 8,880,218 B2 | 11/2014 | Bartholomew et al. | |
| 8,884,242 B2 | 11/2014 | Chhibber et al. | |
| 8,908,904 B2 | 12/2014 | Santos et al. | |
| 8,915,562 B2 | 12/2014 | Edgar et al. | |
| 8,933,994 B2 | 1/2015 | Gross et al. | |
| 8,995,760 B2 | 3/2015 | Gill | |
| 9,007,588 B1 | 4/2015 | Igarashi | |
| 9,064,180 B2 | 6/2015 | Korichi et al. | |
| 9,101,320 B2 | 8/2015 | Cummins et al. | |
| 9,122,918 B2 | 9/2015 | Howell et al. | |
| 9,122,919 B2 | 9/2015 | Howell et al. | |
| 9,239,294 B2 | 1/2016 | Wagner et al. | |
| 9,256,963 B2 | 2/2016 | Cummins et al. | |
| 9,384,543 B2 | 7/2016 | Stephan et al. | |
| 9,427,187 B2 | 8/2016 | Gilbert | |
| 9,442,494 B2 | 9/2016 | Igarashi | |
| 9,449,400 B2 | 9/2016 | Stephan et al. | |
| 9,452,279 B2 | 9/2016 | Stevens et al. | |
| 9,498,974 B2 | 11/2016 | Choi | |
| 9,522,112 B2 | 12/2016 | Dubois et al. | |
| 9,674,323 B1 | 6/2017 | Yu et al. | |
| 9,858,685 B2 | 1/2018 | Nichol et al. | |
| 2001/0047309 A1 | 11/2001 | Bartholomew et al. | |
| 2002/0021439 A1 * | 2/2002 | Priestley | G01J 3/46 356/243.5 |
| 2002/0082745 A1 | 6/2002 | Wilmott et al. | |
| 2002/0179639 A1 | 12/2002 | Bartholomew et al. | |
| 2003/0067545 A1 | 4/2003 | Giron et al. | |
| 2003/0090176 A1 | 5/2003 | Bartholomew et al. | |
| 2004/0064167 A1 * | 4/2004 | Berry | A61B 18/203 607/89 |
| 2004/0078278 A1 | 4/2004 | Dauga et al. | |
| 2004/0201846 A1 * | 10/2004 | Mullani | A61B 5/0059 356/369 |
| 2004/0202684 A1 | 10/2004 | Djerassi | |
| 2005/0111729 A1 | 5/2005 | Caisey | |
| 2005/0116609 A1 * | 6/2005 | Kokubo | G09G 3/3413 313/495 |
| 2005/0153755 A1 * | 7/2005 | Suzuki | H01Q 1/243 455/575.7 |
| 2005/0195316 A1 | 9/2005 | Kollias et al. | |
| 2006/0000852 A1 | 1/2006 | Manne | |
| 2006/0001193 A1 | 1/2006 | Booth | |
| 2006/0002109 A1 * | 1/2006 | Imade | H04N 9/3114 362/231 |
| 2006/0023202 A1 * | 2/2006 | Delacour | G01N 21/55 356/121 |
| 2006/0092315 A1 | 5/2006 | Payonk et al. | |
| 2006/0124196 A1 | 6/2006 | Bartholomew et al. | |
| 2006/0152744 A1 | 7/2006 | Sanger | |
| 2006/0193800 A1 | 8/2006 | Reinhardt et al. | |
| 2006/0239005 A1 * | 10/2006 | De Godzinsky | H05B 33/0821 362/276 |
| 2006/0280851 A1 | 12/2006 | Pike | |
| 2007/0035815 A1 | 2/2007 | Edgar et al. | |
| 2007/0058860 A1 | 3/2007 | Harville et al. | |
| 2007/0097358 A1 * | 5/2007 | Oon | G01J 3/10 356/218 |
| 2007/0189627 A1 | 8/2007 | Cohen et al. | |
| 2007/0213696 A1 * | 9/2007 | Altshuler | A61B 18/203 606/9 |
| 2007/0253987 A1 | 11/2007 | Wozniak et al. | |
| 2008/0080766 A1 * | 4/2008 | Payonk | A45D 44/005 382/167 |
| 2008/0180671 A1 * | 7/2008 | Lim | G01J 1/32 356/419 |
| 2008/0194928 A1 | 8/2008 | Bandic et al. | |
| 2008/0311061 A1 | 12/2008 | Heuer | |
| 2009/0046903 A1 * | 2/2009 | Corcoran | G06K 9/00046 382/124 |
| 2009/0067695 A1 * | 3/2009 | Komiya | A61B 5/0088 382/128 |
| 2009/0151741 A1 | 6/2009 | Ngo | |
| 2009/0194571 A1 | 8/2009 | Evans | |
| 2009/0210322 A1 | 8/2009 | Stark | |

(56) References Cited

U.S. PATENT DOCUMENTS

| | | |
|---|---|---|
| 2009/0213379 A1 | 8/2009 | Carroll et al. |
| 2010/0123401 A1* | 5/2010 | Park ................ G09G 3/3426 |
| | | 315/153 |
| 2010/0181340 A1 | 7/2010 | Wallace et al. |
| 2010/0185064 A1 | 7/2010 | Bandic et al. |
| 2010/0225429 A1 | 9/2010 | Tsai |
| 2010/0284245 A1 | 11/2010 | McNicol et al. |
| 2011/0162673 A1 | 7/2011 | Samain et al. |
| 2011/0164263 A1 | 7/2011 | Samain et al. |
| 2011/0176029 A1 | 7/2011 | Boydston et al. |
| 2011/0226803 A1 | 9/2011 | Schwartz |
| 2011/0247718 A1 | 10/2011 | Samain |
| 2011/0280561 A1* | 11/2011 | Geffert ................ H04N 5/235 |
| | | 396/164 |
| 2011/0288680 A1 | 11/2011 | Samain et al. |
| 2011/0304877 A1 | 12/2011 | Bitoh |
| 2012/0152406 A1 | 6/2012 | Bartholomew et al. |
| 2012/0203089 A1 | 8/2012 | Rule et al. |
| 2012/0236425 A1 | 9/2012 | O'Neill |
| 2012/0300050 A1 | 11/2012 | Korichi et al. |
| 2012/0307032 A1 | 12/2012 | Gomi et al. |
| 2012/0320340 A1 | 12/2012 | Coleman, III |
| 2013/0012144 A1* | 1/2013 | Besoli ................ H01Q 1/36 |
| | | 455/85 |
| 2013/0083185 A1 | 4/2013 | Coleman, III |
| 2013/0084259 A1 | 4/2013 | Lee |
| 2013/0098382 A1 | 4/2013 | Martin et al. |
| 2013/0107109 A1 | 5/2013 | Yang |
| 2013/0123973 A1 | 5/2013 | Saranow et al. |
| 2013/0300919 A1 | 11/2013 | Fletcher et al. |
| 2014/0050635 A1 | 2/2014 | Azzi et al. |
| 2014/0071547 A1 | 3/2014 | O'Neill et al. |
| 2014/0074193 A1 | 3/2014 | Luzon et al. |
| 2014/0078594 A1 | 3/2014 | Springer |
| 2014/0081462 A1 | 3/2014 | Igarashi |
| 2014/0081463 A1 | 3/2014 | Igarashi |
| 2014/0082854 A1 | 3/2014 | Landa et al. |
| 2014/0094964 A1 | 4/2014 | Bartholomew et al. |
| 2014/0152990 A1 | 6/2014 | Ehbets et al. |
| 2014/0176787 A1 | 6/2014 | Sheng et al. |
| 2014/0267882 A1 | 9/2014 | O'Neill et al. |
| 2014/0268376 A1 | 9/2014 | O'Neill et al. |
| 2014/0296112 A1 | 10/2014 | O'Driscoll et al. |
| 2014/0304629 A1 | 10/2014 | Cummins et al. |
| 2014/0311625 A1 | 10/2014 | Bartholomew et al. |
| 2014/0323873 A1 | 10/2014 | Cummins et al. |
| 2014/0368629 A1 | 12/2014 | Lucet-Levannier et al. |
| 2014/0368731 A1 | 12/2014 | Hyers |
| 2015/0002950 A1 | 1/2015 | O'Neill et al. |
| 2015/0009500 A1* | 1/2015 | Wong ................ G01R 35/005 |
| | | 356/402 |
| 2015/0021356 A1 | 1/2015 | Witchell et al. |
| 2015/0025343 A1 | 1/2015 | Gareau et al. |
| 2015/0030243 A1 | 1/2015 | Qu et al. |
| 2015/0042877 A1 | 2/2015 | O'Neill et al. |
| 2015/0065803 A1 | 3/2015 | Douglas et al. |
| 2015/0087359 A1 | 3/2015 | O'Neill et al. |
| 2015/0099463 A1* | 4/2015 | Stuntebeck ........ H04W 52/0219 |
| | | 455/41.1 |
| 2015/0172522 A1 | 6/2015 | O'Neill et al. |
| 2015/0177147 A1 | 6/2015 | Mangan et al. |
| 2015/0198522 A1 | 7/2015 | Wei et al. |
| 2015/0287191 A1 | 10/2015 | Koruga et al. |
| 2015/0293430 A1 | 10/2015 | O'Neill et al. |
| 2015/0297129 A1 | 10/2015 | Gilbert |
| 2015/0314141 A1 | 11/2015 | Choi |
| 2015/0334258 A1 | 11/2015 | O'Neill |
| 2015/0356661 A1 | 12/2015 | Rousay |
| 2015/0370150 A1 | 12/2015 | O'Neill et al. |
| 2016/0015152 A1 | 1/2016 | Ajiki et al. |
| 2016/0022011 A1 | 1/2016 | Rabe et al. |
| 2016/0022972 A1 | 1/2016 | Rabe et al. |
| 2016/0080548 A1 | 3/2016 | Erickson et al. |
| 2016/0082403 A1 | 3/2016 | Ounzar |
| 2016/0106369 A1 | 4/2016 | Yetik |
| 2016/0107133 A1 | 4/2016 | Sugino et al. |
| 2016/0161337 A1 | 6/2016 | Stephane |
| 2016/0184566 A1 | 6/2016 | Ibrahim et al. |
| 2016/0270509 A1 | 9/2016 | Shahrur et al. |
| 2016/0270511 A1 | 9/2016 | Wee |
| 2016/0309877 A1 | 10/2016 | Papshev et al. |
| 2016/0361526 A1 | 12/2016 | Rabe et al. |
| 2017/0196471 A1* | 7/2017 | Inoue ................ A61B 5/02433 |
| 2017/0228892 A1 | 8/2017 | Nichol et al. |
| 2017/0353685 A1* | 12/2017 | Liu ................ H04N 5/378 |
| 2018/0310872 A1* | 11/2018 | Tseng ................ A61B 5/443 |

FOREIGN PATENT DOCUMENTS

| | | |
|---|---|---|
| CA | 2 574 486 C | 2/2006 |
| CA | 2 587 098 A1 | 5/2006 |
| CN | 1348760 A | 5/2002 |
| CN | 101432748 A | 5/2009 |
| EP | 2 000 089 A1 | 12/2008 |
| FR | 2 650 890 A1 | 2/1991 |
| FR | 2894667 | 6/2007 |
| FR | 2 937 853 | 10/2008 |
| HK | 1069746 A1 | 10/2007 |
| HK | 1117623 A1 | 8/2013 |
| JP | 4231407 B2 | 12/2008 |
| JP | 4699473 B2 | 6/2011 |
| JP | 5196695 B2 | 5/2013 |
| JP | 5514289 B2 | 4/2014 |
| JP | 2014-168781 A | 9/2014 |
| JP | 2015-178959 | 10/2015 |
| JP | 2016-026183 A | 2/2016 |
| KR | 2001-0092556 | 10/2001 |
| KR | 10-2006-0109797 | 10/2006 |
| KR | 10-2007-0006288 | 1/2007 |
| KR | 10-2010-0062903 | 6/2010 |
| KR | 10-2011-0019793 | 3/2011 |
| KR | 10-2012-0075517 | 7/2012 |
| KR | 10-2012-0135594 | 12/2012 |
| KR | 10-2013-0062845 | 6/2013 |
| KR | 10-2014-0072685 | 6/2014 |
| KR | 10-1490987 | 2/2015 |
| KR | 101520386 B1 | 5/2015 |
| KR | 10-1555636 B1 | 9/2015 |
| KR | 10-2015-0120542 | 10/2015 |
| KR | 10-2015-0134455 | 12/2015 |
| TW | 201401204 A | 1/2014 |
| WO | WO 01/55956 A1 | 8/2001 |
| WO | WO 2001/75586 A1 | 10/2001 |
| WO | WO 03/026458 A2 | 4/2003 |
| WO | WO 2004/091477 A2 | 10/2004 |
| WO | WO 2006/024962 A2 | 3/2006 |
| WO | WO 2006/052863 A1 | 5/2006 |
| WO | WO 2006/081351 A2 | 8/2006 |
| WO | WO 2008/108763 A1 | 9/2008 |
| WO | WO 2010/049907 A2 | 5/2010 |
| WO | WO 2012/058641 A2 | 5/2012 |
| WO | WO 2012/082738 A1 | 6/2012 |
| WO | WO 2014/043018 A1 | 3/2014 |
| WO | WO 2015/003319 A1 | 1/2015 |
| WO | WO 2015/088079 A1 | 6/2015 |
| WO | WO 2015/111002 A1 | 7/2015 |

* cited by examiner

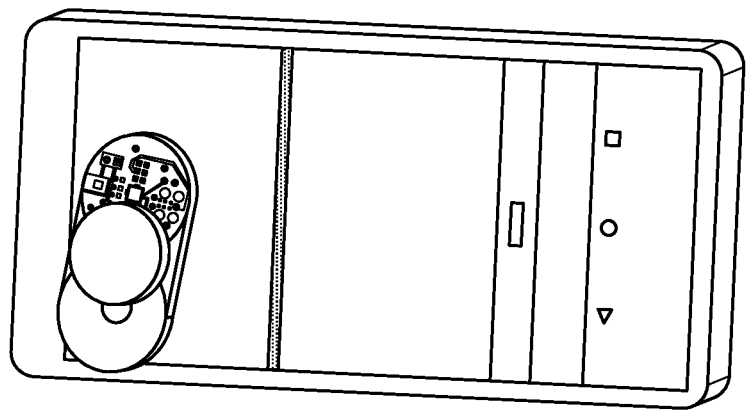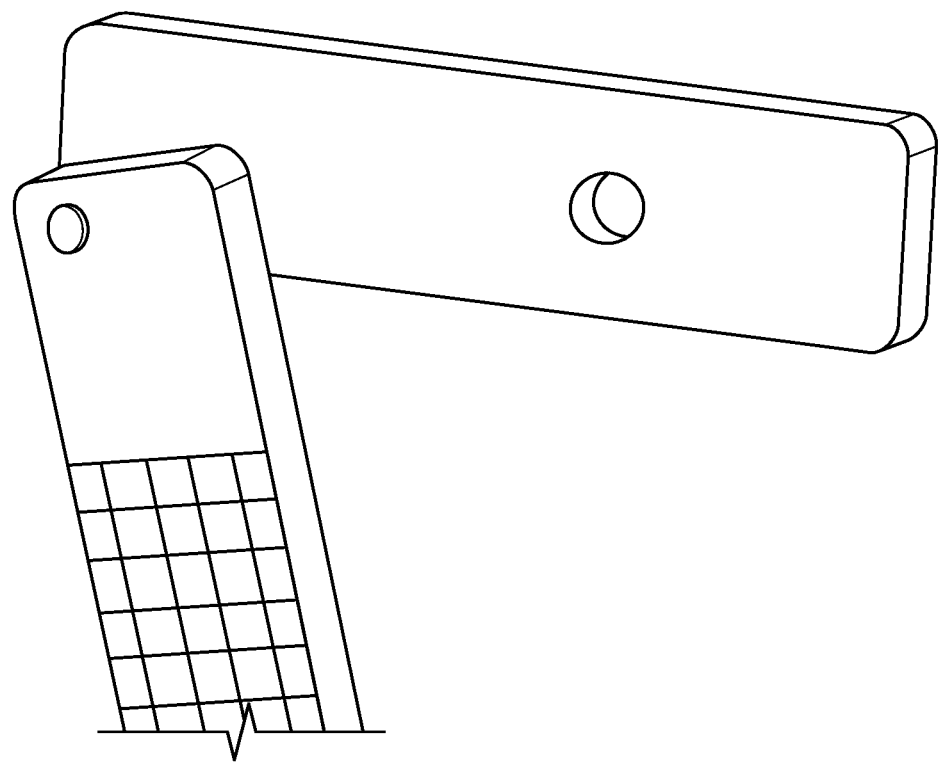
FIG. 13

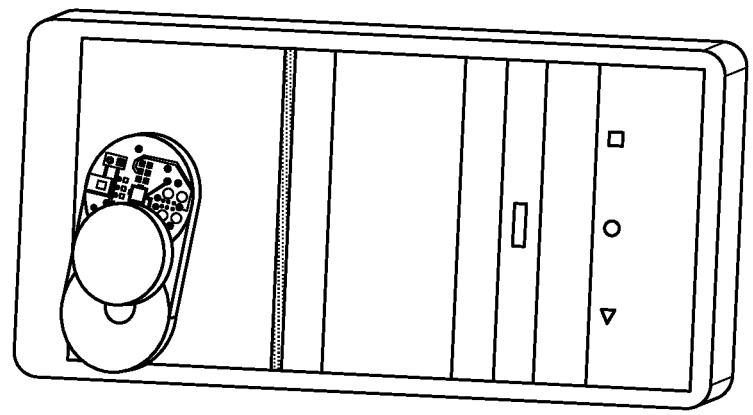
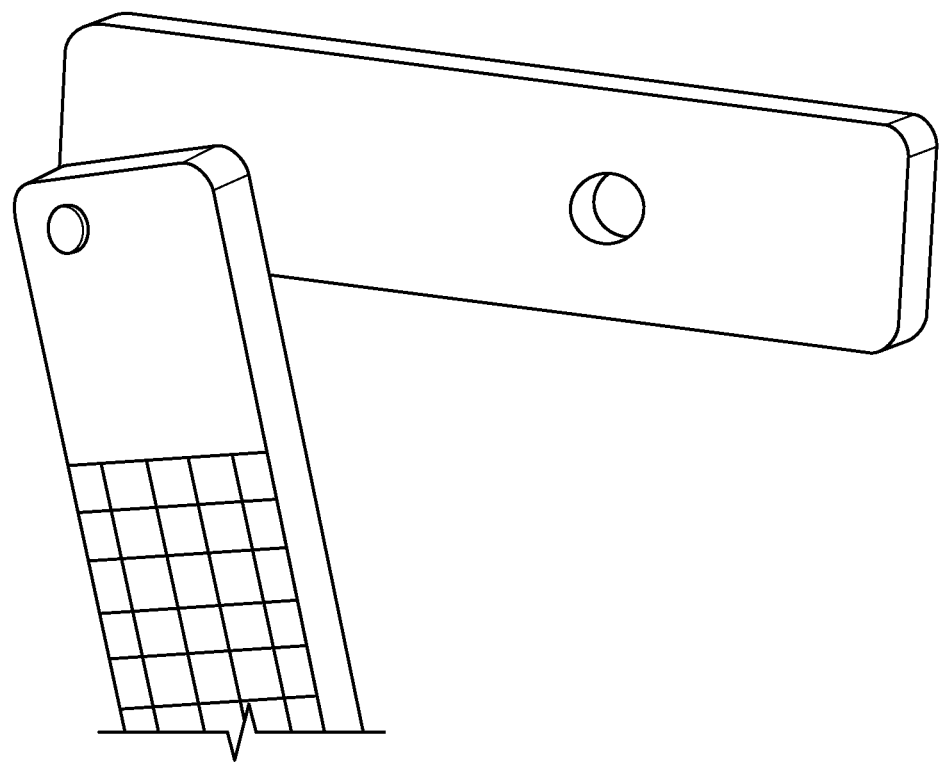
FIG. 14

COLOR CAPTURE SYSTEM AND DEVICE

CROSS-REFERENCE TO RELATED APPLICATION(S)

This patent application is related to U.S. patent application Ser. No. 15/782,403 filed on Oct. 12, 2017, which is a continuation of U.S. patent application Ser. No. 15/427,399 filed on Feb. 8, 2017 (U.S. Pat. No. 9,858,685), which claims the benefit of U.S. provisional patent application Ser. No. 62/292,567 filed on Feb. 8, 2016), each which is hereby incorporated herein by reference in its entirety.

FIELD OF THE INVENTION

The present invention relates to a color capture device such as for creating customized cosmetics.

BACKGROUND

The field of custom cosmetics is growing at a feverish clip. Soon, many cosmetics companies will have systems that produce customized cosmetics based on, for example, a customer's skin color. Some cosmetics retailers plan to operate custom cosmetics mixing and dispensing machines at production sites such as retail stores or on-line order fulfillment sites. In some cases, the entire process of recording skin color measurements for a customer, producing a custom cosmetics recipe based on the skin color measurements, and mixing and dispensing the customized cosmetic based on the custom cosmetics recipe, can occur in the store while the customer waits. In other cases, recording of the customer's skin color measurements can be done offsite, such as by the customer at home, with the recorded information transmitted in unprocessed form (e.g., raw data readings) or processed form (e.g., processed to characterize the captured color and/or converted into a custom cosmetics recipe) to a production site where the customized cosmetic is mixed and dispensed.

SUMMARY OF EXEMPLARY EMBODIMENTS

In accordance with one embodiment of the invention, a color capture device comprises at least one LED capable of selectively producing red light, green light, and blue light; a light sensor circuit; a loop antenna; and a microcontroller having a timer circuit, the microcontroller comprising firmware that, when executed on the microcontroller, causes the microcontroller to implement computer processes for a color capture sequence, the computer processes comprising:
  controlling at least one output pin on the microcontroller to produce the blue light from the at least one LED;
  using the light sensor circuit and the timer to take a light intensity measurement with the blue light on;
  controlling at least one output pin on the microcontroller to produce the green light from the at least one LED;
  using the light sensor circuit and the timer to take a light intensity measurement with the green light on;
  controlling at least one output pin on the microcontroller to produce the red light from the at least one LED;
  using the light sensor circuit and the timer to take a light intensity measurement with the red light on;
  formatting a message including color measurement information derived from the light intensity measurements; and
  controlling at least one output pin on the microcontroller to transmit the message electromagnetically using the loop antenna.

In various alternative embodiments, the at least one LED may include separate red, green, and blue LEDs (in which case the color capture device may include a first resistor coupled to the blue LED, a second resistor coupled to the green LED, and a third resistor coupled to the red LED, wherein the resistors are selected so that the LEDs have substantially equal intensities) or may include a three-color red-green-blue LED. Using the light sensor circuit and the timer to take a light intensity measurement may involve measuring an amount of time for the cumulative light intensity to reach a predetermined level or measuring the light intensity after a predetermined amount of time. Controlling at least one output pin on the microcontroller to transmit the message electromagnetically using the loop antenna may involve controlling the at least one output pin to produce binary transmission signals (e.g., controlling the at least one output pin to produce a positive current in the loop antenna to transmit a first transmission state and controlling the at least one output pin to produce a negative current in the loop antenna to transmit a second transmission state) or controlling the at least one output pin to produce trinary transmission signals. The light sensor circuit may include a phototransistor or a photodiode.

Additionally or alternatively, the light sensor circuit may include a light sensor and a capacitor, in which case the light sensor may have an output coupled to charge the capacitor, and the capacitor may be coupled to an input pin of the microcontroller. Using the light sensor circuit and the timer to take a light intensity measurement may involve measuring an amount of time for the capacitor charge to reach a predetermined level or measuring the capacitor charge after a predetermined amount of time (e.g., using an analog-to-digital converter to convert the capacitor charge to a digital value).

Additionally or alternatively, the computer processes may further comprise waiting a predetermined amount of time after taking the light intensity measurements before controlling at least one output pin on the microcontroller to transmit the message electromagnetically using the loop antenna, using the light sensor circuit to detect a light level below a predetermined threshold before controlling at least one output pin on the microcontroller to transmit the message electromagnetically using the loop antenna, and/or receiving a user input before controlling at least one output pin on the microcontroller to transmit the message electromagnetically using the loop antenna.

Additionally or alternatively, the color capture device may include a switch having an output coupled to the microcontroller, in which case the computer processes may further comprise monitoring for user operation of the switch and either initiating the color capture sequence or controlling at least one output pin on the microcontroller to transmit the message electromagnetically using the loop antenna upon operation of the switch.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which:

FIGS. 11-14 are photographs demonstrating a color capture process in accordance with an exemplary embodiment.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions

Figure 1:
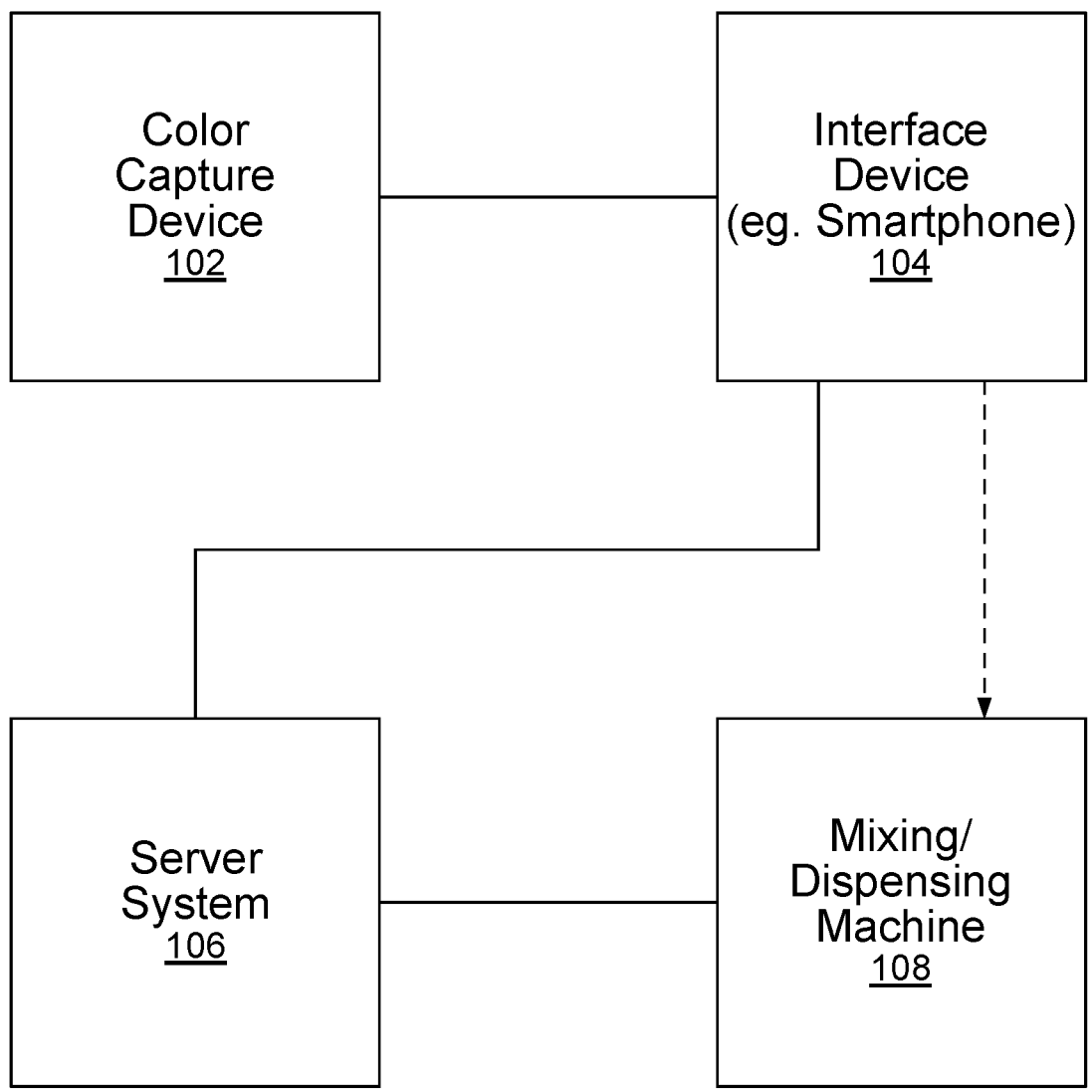
FIG. 1 is a schematic diagram of a custom cosmetics system in accordance with one exemplary embodiment.

As used in this description and the accompanying claims, the following terms shall have the meanings indicated, unless the context otherwise requires:

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer. References to "embodiments of the invention" with respect to a particular function or feature do not necessary require that all embodiments include that particular function or feature.

A "set" includes at least one member.

As discussed above, skin color measurements can be recorded at an offsite location, such as by the customer at the customer's home, and then the recorded information can be transmitted in unprocessed form (e.g., raw data readings) or processed form (e.g., processed to characterize the captured color and/or converted into a custom cosmetics recipe) to a production site where the customized cosmetic is mixed and dispensed. Such offsite recording of skin color information calls for a simple and very inexpensive color capture device that can be distributed easily to customers, such as in stores or by mail, and can be used easily by customers. Cost and ease-of-use are considered by the inventor to be critical for the success of the color capture device and of the custom cosmetics system that relies on the color capture device. If the color capture device is too expensive, then it likely will not be worthwhile for the cosmetics company to produce and distribute color capture devices in volume. If the color capture device is too difficult to use (e.g., too difficult for the customer to operate to capture skin color measurements, or too difficult for the customer to ensure that the measurement information is transmitted), then the captured color information could be unreliable, which could lead to mismatched customized cosmetics and ultimately customer dissatisfaction, or customers simply may not bother to use the color capture device.

Exemplary embodiments provide a simple, inexpensive, and easy-to-operate color capture device that can capture color information and transmit the captured color information to an interface device such as smartphone, where the captured color information is optionally processed and is then transmitted to a remote server for subsequent production of the customized cosmetic. Exemplary embodiments strive to provide a color capture device at a negligible cost, with simple controls and inexpensive components. For example, in exemplary embodiments, technologies such as Bluetooth™ and RFID are considered to be too expensive and too complex for inclusion in the color capture device.

FIG. 1 is a schematic diagram of a custom cosmetics system in accordance with one exemplary embodiment. Here, a color capture device 102 records skin color measurements of a customer and transmits the skin color measurements to an interface device 104, such as a smartphone of the customer, which runs a specially-configured "app" to receive the skin color measurements from the color capture device 102 and transmit processed or unprocessed information to a server system 106. A custom cosmetics recipe created from the skin color measurements is provided to the mixing/dispensing machine 108, which produces the custom cosmetic based on the custom cosmetics recipe. The custom cosmetics recipe can be generated through processing by the color capture device 102, the interface device 104, the server system 106, and/or the mixing/dispensing machine 108. For example, one device (e.g., the server system 106) may perform substantially all of the processing to characterize the skin color and produce the custom cosmetics recipe, or a combination of devices may collectively perform the processing. The server system 106 and the mixing/dispensing machine 108 may be located at the same location or at different locations. Some or all functionality of the server system 106 may be integrated into the mixing/dispensing machine 108. Similarly, the interface device 104 and the server system 106 may be located at the same location or at different locations. Some or all functionality of the server system 106 may be integrated into the interface device 104.

Communications between the interface device 104 and the server system 106 can utilize any available communication facilities, such as, for example, Internet via cellular or WiFi facilities of the interface device 104. In some embodiments, the interface device 104 may communicate directly with the mixing/dispensing machine 108 using such communication facilities (e.g., the interface device 104 may perform processing to characterize the skin color, produce the custom cosmetics recipe, and send the custom cosmetics recipe to the mixing/dispensing machine 108).

In an exemplary embodiment, for the sake of simplicity and cost, the color capture device 102 includes three LEDs (blue, green, and red) and a light sensor (e.g., a photodiode or phototransistor) for use in recording skin color measurements. The LEDs are preferably arranged so that substantially all of the light received by the light sensor from the LEDs is from reflection off of a surface such as the customer's skin. In an exemplary embodiment, the light sensor measures the amount (e.g., the intensity) of received light but not the color of the received light, although alternative embodiments may utilize other types of light sensors. In an exemplary embodiment, a measurement is recorded for each LED individually, i.e., with the LED on and the two other LEDs off, where the color capture device 102 records the amount of time (e.g., clock cycles) between the LED being turned on and the cumulative amount of light at the light sensor reaching a predetermined level based on the photocurrent of the light sensor (e.g., with the photocurrent of the light sensor coupled so as to charge an output capacitor). The wavelength of each LED is known, and the amount of time (e.g., clock cycles) represents a measure of the intensity of the light reflected off of the customer's skin (e.g., in an inverse relationship, such that the longer it takes for the output capacitor to charge, the less light from the LED is being reflected off of the customer's skin). In an alternative embodiment, measurements can be taken for a predetermined amount of time, where the color capture device 102 records the intensity of the light (e.g., the magnitude of the output of the light sensor) such as through use of an analog-to-digital converter (which is included in some microcontrollers) to produce a digital value corresponding to the intensity. Additionally, a transimpedance amplifier may be used to create a voltage proportional to the photocurrent, allowing photocurrent to be read nearly instantaneously, shortening measurement time. In either case, the customer's skin color can be characterized based on the wavelengths and the intensity measurements for the three LEDs. In an exemplary embodiment, each LED is fed by a current-limiting resistor, where the current-limiting resistors are chosen such that the light intensities produced by the LEDs are substantially the same, e.g., such that the LEDs would produce substantially the same current levels from the light sensor if reflected off of a neutral substrate.

In an exemplary embodiment, for the sake of simplicity and cost, the system supports only one-way communication from the color capture device 102 to the interface device 104. In this way, the color capture device 102 can be configured with a rudimentary transmitter. In an exemplary embodiment, the transmitter is in the form of a loop antenna (e.g., a coil) that produces electromagnetic signals capable of being received by the interface device 104 such as by a magnetometer of the interface device 104. In another embodiment, the color LED's can be used to transmit color measurement information to the interface device via camera or ambient light sensor. Additionally, the signals can be encoded as audio tones and transmitted to the interface device via acoustic coupling (e.g., speaker to microphone), electrical coupling via the headphone port, or wirelessly via Bluetooth or other audio transmission protocol. Alternative embodiments can be configured to support two-way communication between the color capture device 102 and the interface device 104 if needed or desired for additional functionality, e.g., to allow for device-specific pairing, coordination or control of the recording or transmission of measurements by the interface device 104, uploading of data from the interface device 104 to the color capture device 102, etc.

Figure 2:
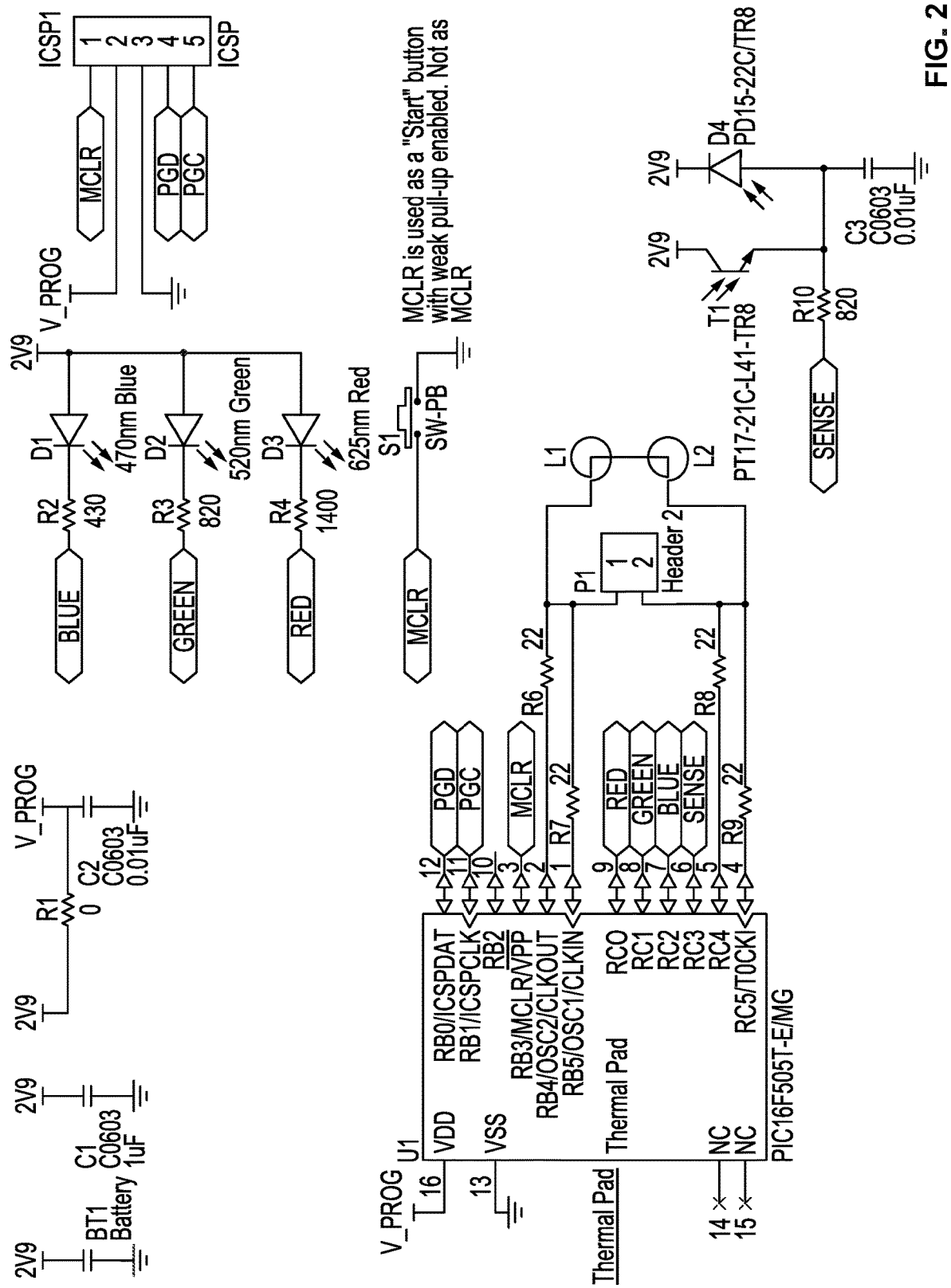
FIG. 2 is a schematic diagram for color capture device circuitry in accordance with an exemplary embodiment.

FIG. 2 is a schematic diagram for color capture device circuitry in accordance with an exemplary embodiment. Among other things, the exemplary color capture device 102 includes:

a microcontroller (U1) such as a PIC16F505T-E/MG 8-bit microcontroller manufactured by Microchip Technology Inc.;

a 470 nm wavelength blue LED (D1) fed by a resistor (R2) and controlled by the microcontroller via output pin RC2 (BLUE);

a 520 nm wavelength green LED (D2) fed by a resistor (R3) and controlled by the microcontroller via output pin RC1 (GREEN);

a 625 nm wavelength red LED (D3) fed by a resistor (R4) and controlled by the microcontroller via output pin RC0 (RED);

a light sensor circuit monitored by the microcontroller via input pin RC3 (SENSE) and including a photodiode (D4) such as a PD15-22C/TR8 photodiode manufactured by Everlight Electronics Co., Ltd. or a phototransistor (Ti) such as a PT17-21C/L41/TR8 phototransistor manufactured by Everlight Electronics Co., Ltd. in parallel with a capacitor (C3) that is charged by the photodiode or phototransistor and also including an over-current protection resistor (R10);

a momentary normally-open push-button switch (S1) that generates a signal (MCLR used as a "start" signal with weak pull-up enabled rather than being used as a traditional "master clear/reset" signal) when the switch is closed;

a battery receptacle (BT1) for holding a battery (e.g., a coin type battery);

a transmitter circuit including a loop antenna (represented by connections L1 and L2) coupled to microcontroller pins RB4 and RC5 via resistors R6 and R9 and also including provisions for a two-pin header (P1) and resistors R7 and R8 allowing external monitoring and testing of the transmitter (the header additionally or alternatively can be used to connect other types of antennas or transmitters, e.g., light or sound transmitters);

provisions for a 2×3 pin in-circuit serial programming header (ICSP1) allowing external programming of the microcontroller via an external reset signal (also referred to as MCLR in the schematic diagram), a programming voltage signal (V PROG), a data signal (PGD), and a clock signal (PGC); and power control circuitry including capacitors C1 and C2 and resistor R1 allowing power from either the battery (BT1) or the in-circuit serial programming header (ICSP1) to be provided to the microcontroller (V PROG provided to pin VDD of the microcontroller).

In this exemplary embodiment, an internal oscillator of the microcontroller is used to make light measurements, although in alternative embodiments, an external oscillator may be used. In some embodiments, a higher clock rate can be used while performing the light measurement in order to increase dynamic range or granularity of the measurement (with perhaps a slight reduction in battery life). Additionally or alternatively, multiple light measurements can be made in rapid succession, with the results combined (e.g., averaged or summed) in order to produce an aggregate light measurement.

In an exemplary embodiment, the microcontroller includes an integral timer that is used for the color measurements, although other timer or measurement circuits could be used in alternative embodiments.

Figure 3:
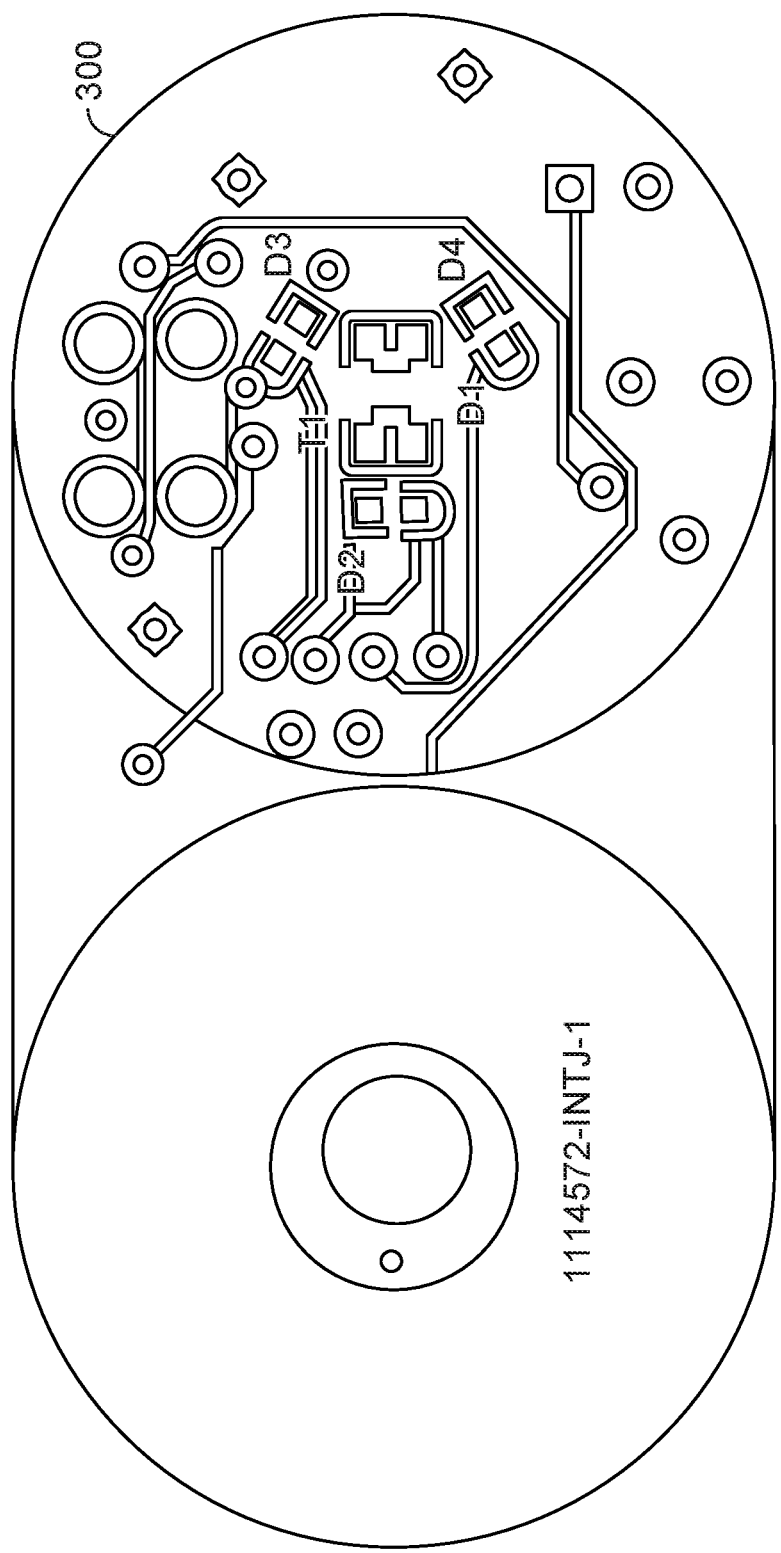
FIG. 3 is a photograph of a front side of a prototype printed circuit board 300 implementing the color capture device circuitry of FIG. 2, in accordance with an exemplary embodiment.
Figure 4:
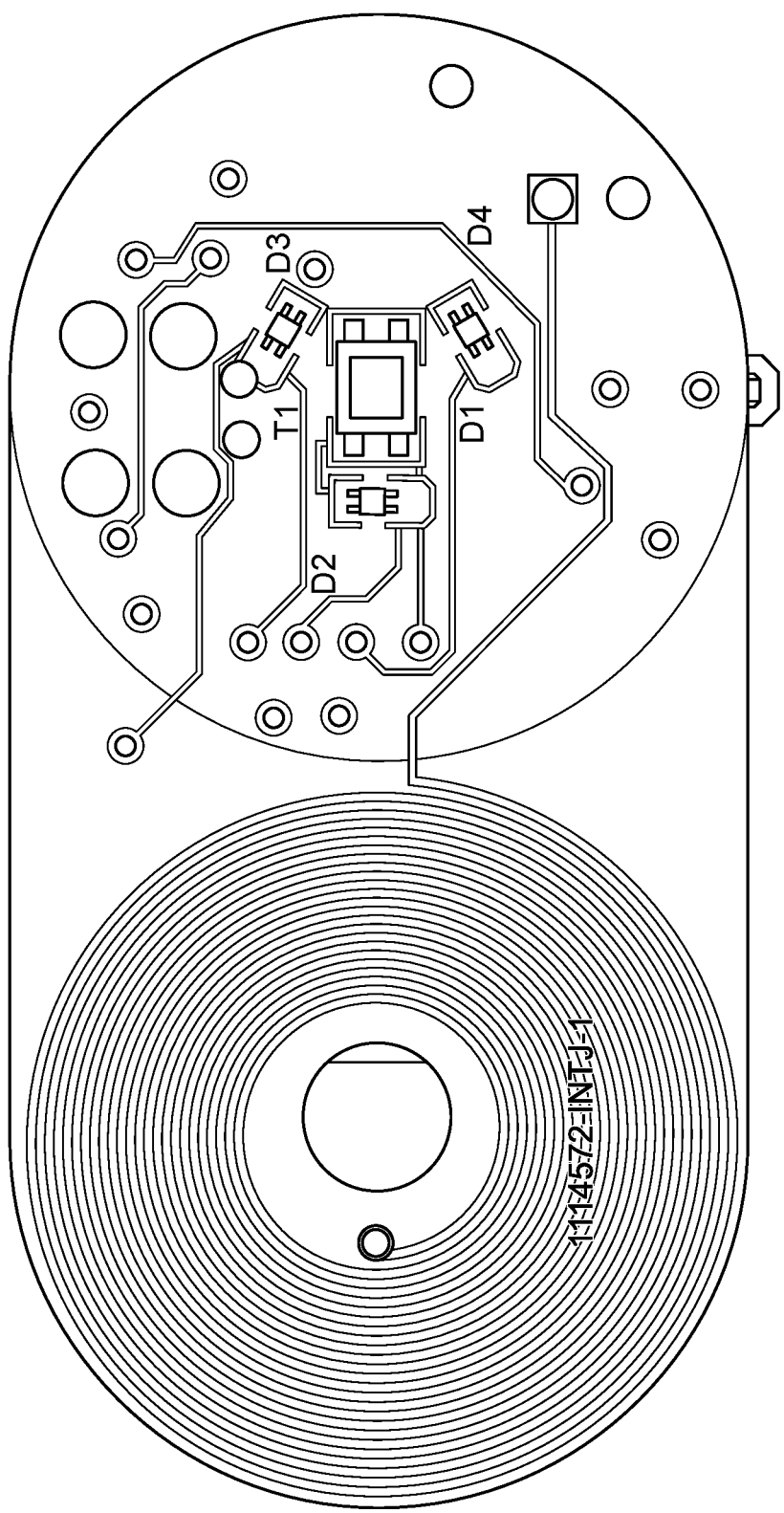
FIG. 4 is a photograph of the front side of the prototype printed circuit board 300 with components mounted.
Figure 5:
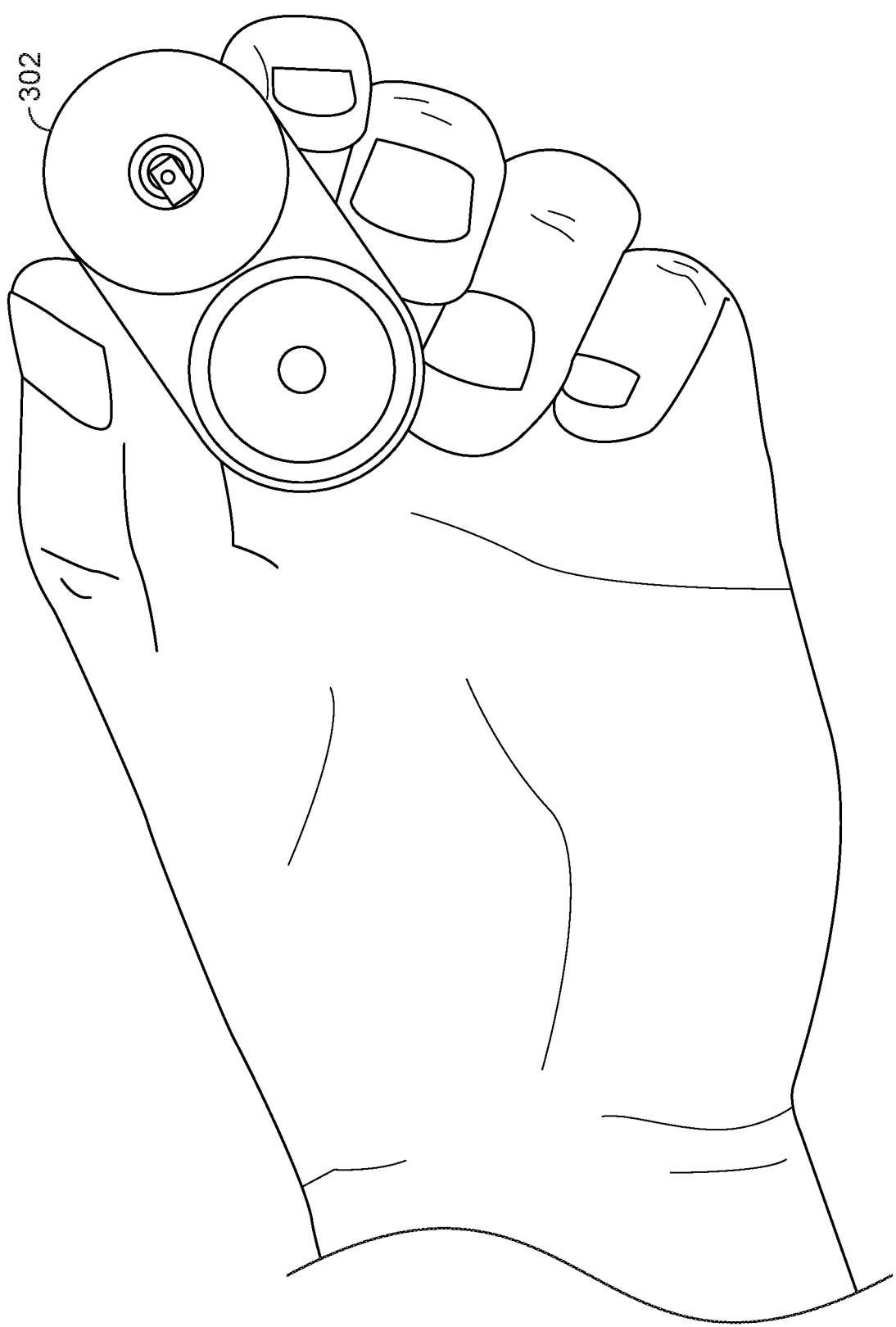
FIG. 5 is a photograph of the front side of the prototype printed circuit board 300 showing the loop antenna and a cover 302 placed over the LEDs and providing a portal for light to enter the light sensor.
Figure 6:
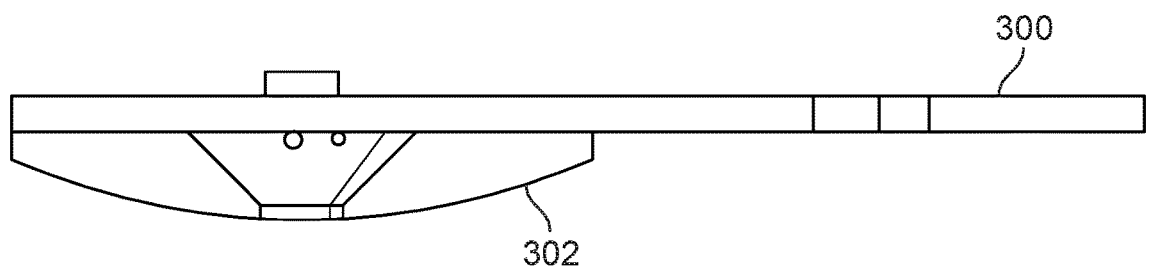
FIG. 6 is a schematic side-view diagram of the color capture device of FIG. 5 showing relative placement of the cover 302 over the prototype printed circuit board 300 in accordance with this exemplary embodiment.

FIG. 3 is a photograph of a front side of a prototype printed circuit board 300 implementing the color capture device circuitry of FIG. 2, in accordance with an exemplary embodiment. The front side of the prototype printed circuit board 300 will face the customer's skin during recording of the skin color measurements. The front side of the prototype printed circuit board 300 provides the mounting locations for the three LEDs (D1, D2, D3), the light sensor (D4 or Ti), and the loop antenna. FIG. 4 is a photograph of the front side of the prototype printed circuit board 300 with components mounted. FIG. 5 is a photograph of the front side of the prototype printed circuit board 300 showing the loop antenna and a cover 302 placed over the LEDs and providing a portal for light to enter the light sensor. When placed against a customer's skin or other surface, the cover will prevent ambient light from reaching the light sensor, thereby ensuring that only light from the LEDs, reflected off of the customer's skin or other surface, will reach the light sensor. Preferably, the inside surface of the cover is substantially non-reflective in order to prevent or reduce LED light from reflecting off of the inside of the cover to the light sensor. FIG. 6 is a schematic side-view diagram of the color capture device of FIG. 5 showing relative placement of the cover 302 over the prototype printed circuit board 300 in accordance with this exemplary embodiment.

Figure 7:
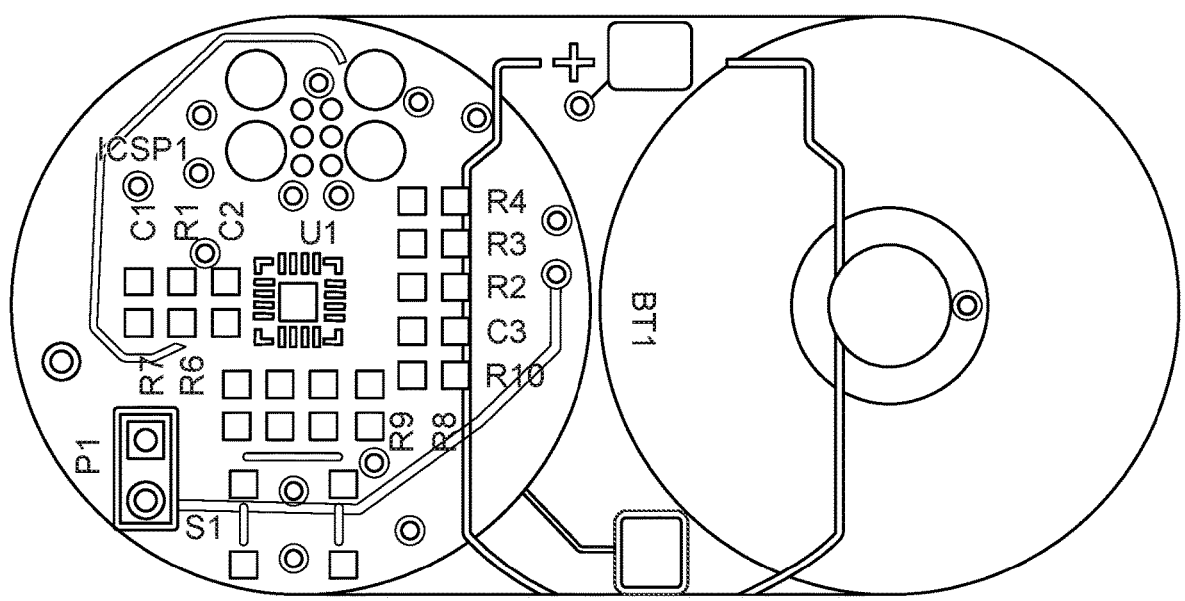
FIG. 7 is a photograph of a back side of the prototype printed circuit board 300 of FIG. 3, in accordance with an exemplary embodiment.
Figure 8:
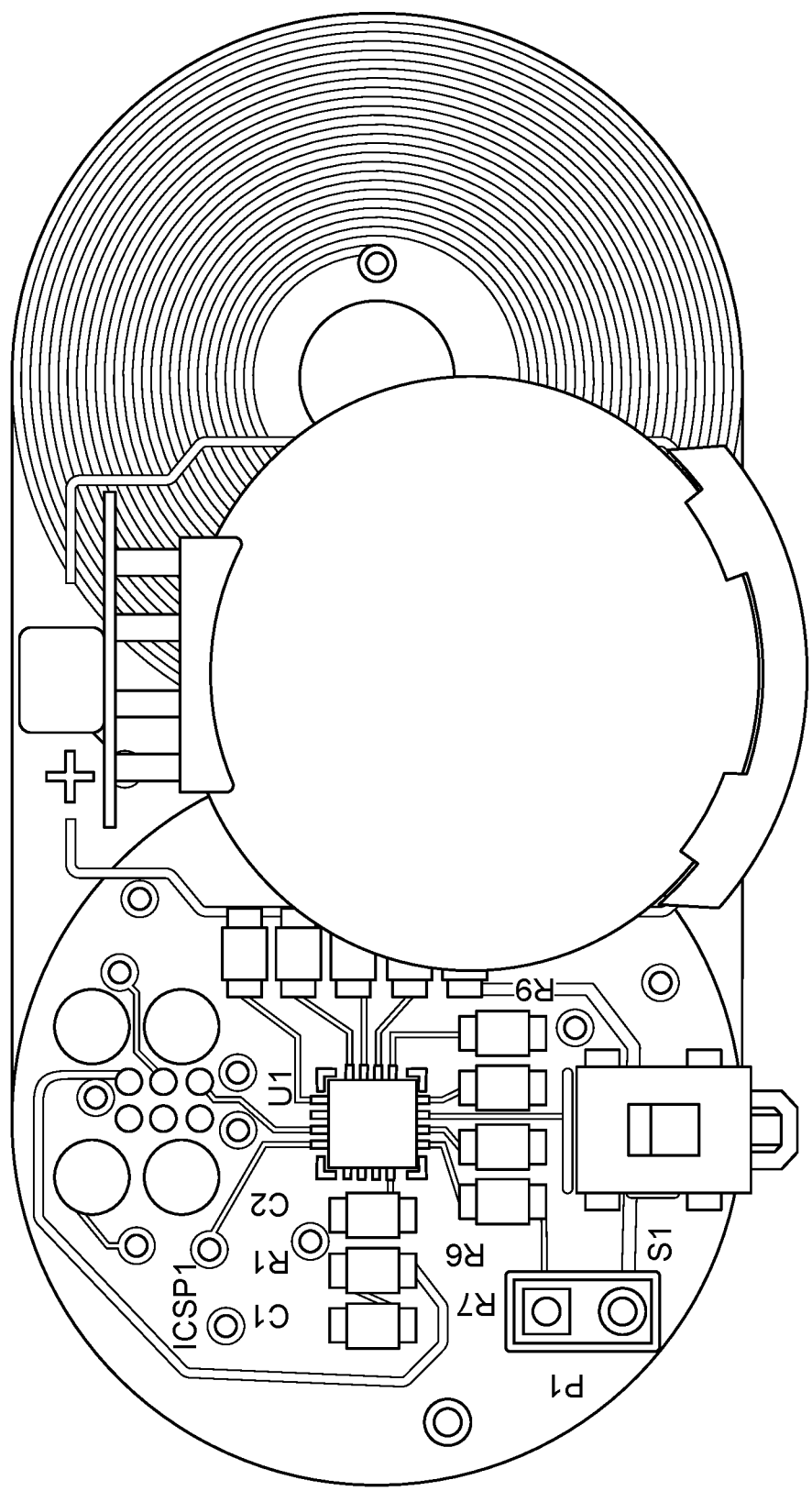
FIG. 8 is a photograph of the back side of the prototype printed circuit board with components mounted.

FIG. 7 is a photograph of a back side of the prototype printed circuit board 300 of FIG. 3, in accordance with an exemplary embodiment. The back side of the printed circuit board provides the mounting locations for the microcontroller U1, capacitors C1-C3, resistors R1-R4 and R6-R10, switch S1, in-circuit serial programming header ICSP1, two-pin header P1, and battery receptacle BT1. In an exemplary embodiment, the coil is a separate coil of wire, although in alternative embodiments, the coil can be implemented using conductive traces formed on or in the printed circuit board itself. FIG. 8 is a photograph of the back side of the prototype printed circuit board with components mounted.

Figure 9:
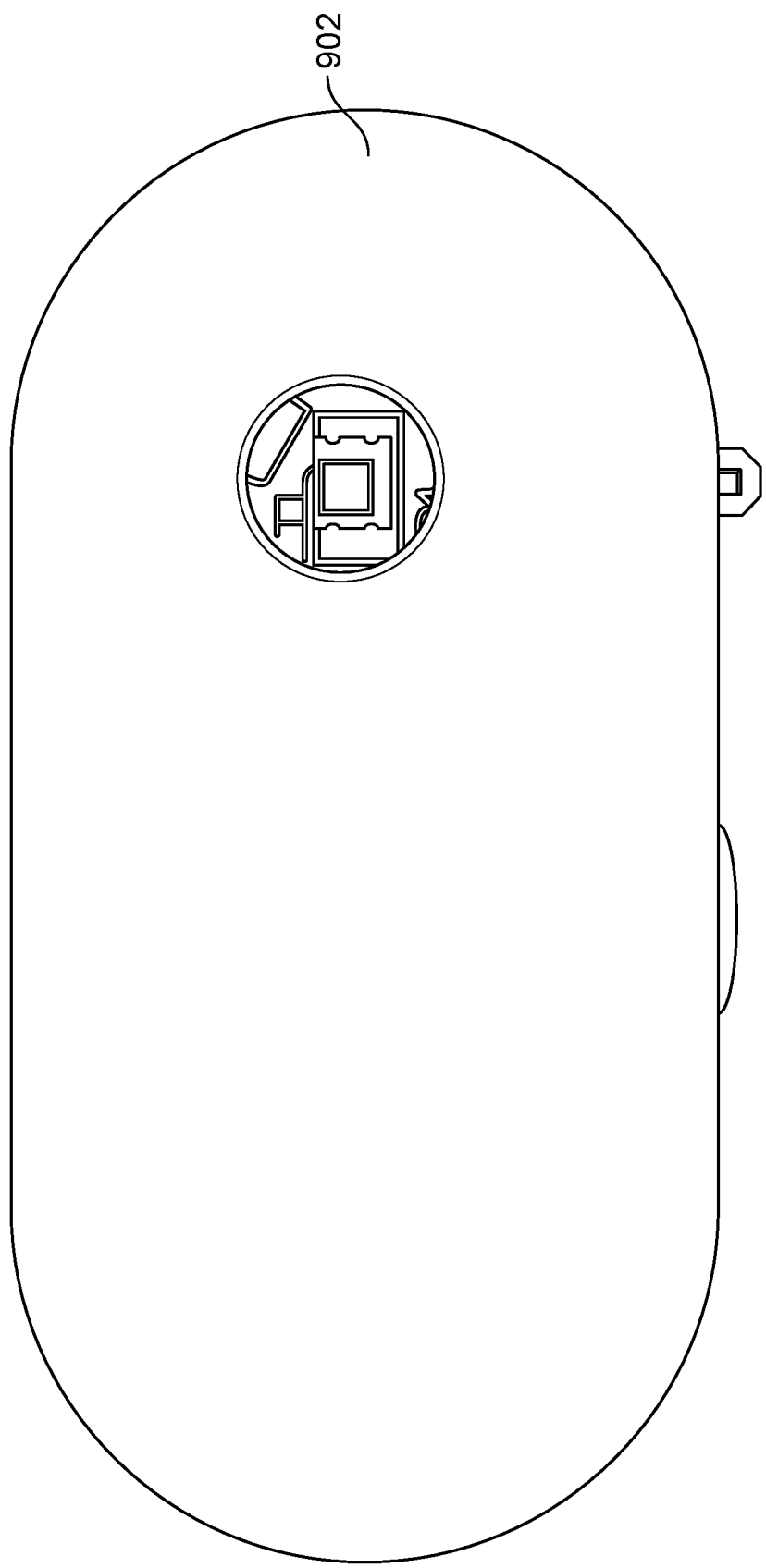
FIG. 9 is a photograph showing an alternative front cover 902 for the color capture device, in accordance with an exemplary embodiment.
Figure 10:
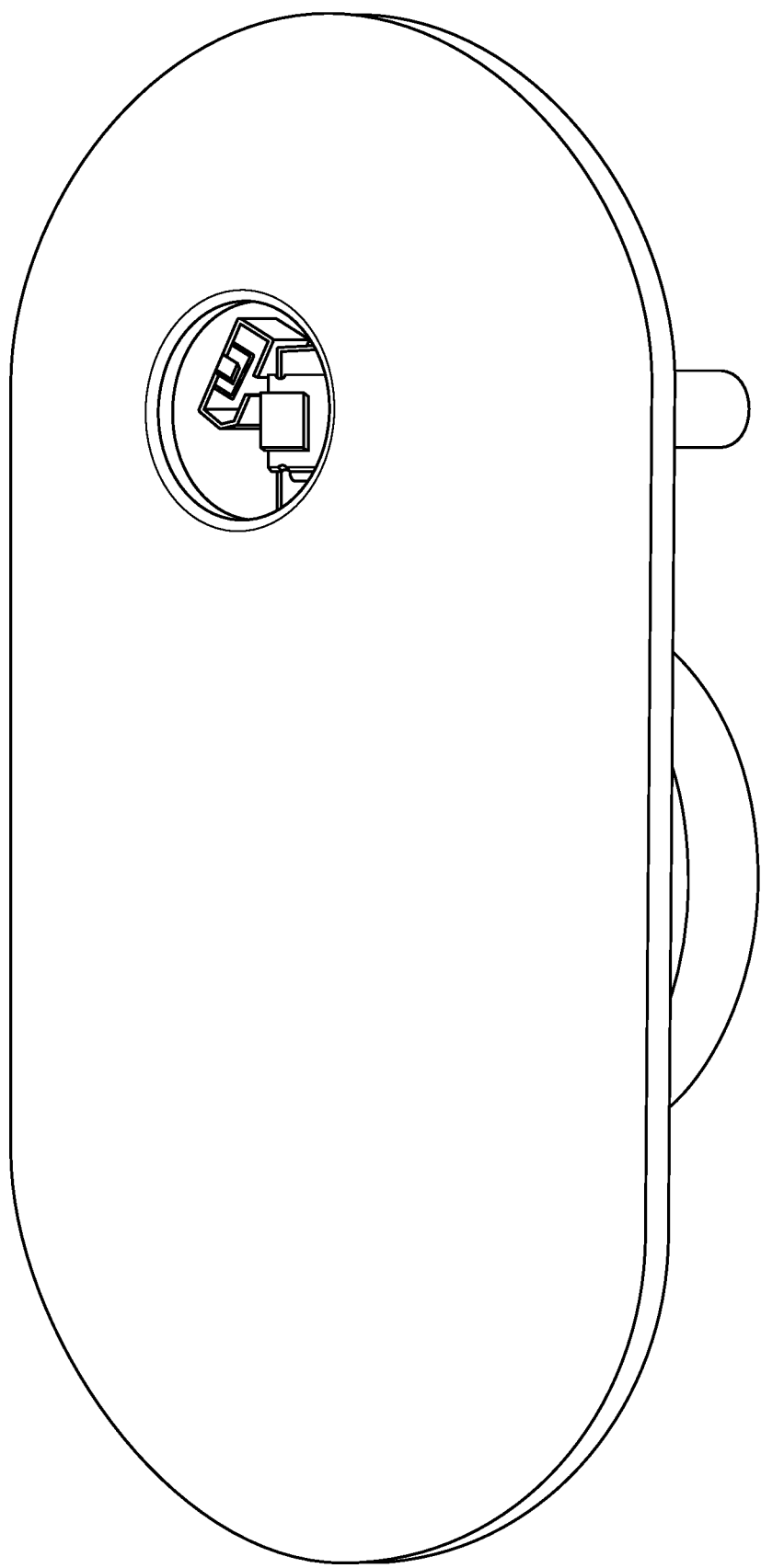
FIG. 10 is a photograph showing a perspective view of the alternative front cover shown in FIG. 9.

FIG. 9 is a photograph showing an alternative front cover 902 for the color capture device, in accordance with an exemplary embodiment. This front cover is configured to provide full coverage for the device and is configured to mate with a corresponding back cover (not shown). FIG. 10 is a photograph showing a perspective view of the alternative front cover shown in FIG. 9.

In an exemplary embodiment, color measurements are taken by performing a color measurement sequence comprising, for each LED successively, discharging the capacitor C3 through the SENSE input via resistor R10, turning on the LED, starting a timer, stopping the timer when the charge in capacitor C3 reaches a predetermined level (e.g., by the microprocessor monitoring the SENSE signal via pin RC3), and recording the value of the timer. In some embodiments, a delay may be added after turning on the LED and before activating the light sensor and starting the timer, e.g., to allow the LED light to reach a steady state intensity before beginning the color measurement. The color measurement sequence may be initiated, for example, by the user operating the switch (S1). For example, the customer may place the color capture device 102 on portion of skin to be matched for a custom cosmetic (e.g., the face) and then operate the switch (S1) to initiate the color measurement sequence. Alternatively, the customer may operate the switch (S1) in order to activate the color capture device 102 and then place the color capture device 102 on the portion of skin to be matched, and the color capture device 102 may begin the color measurement sequence automatically, e.g., a predetermined amount of time after activation of the color capture device 102 or by using the light sensor to determine that the customer has placed the color capture device 102 on the portion of skin to be matched (e.g., detecting absence of ambient light).

Once the color measurement sequence is completed, color measurement information (e.g., the readings for the three LEDs) can be sent to the interface device 104, typically along with other information such as, for example, a unique color capture device identifier that is pre-stored in the color capture device 102 and a checksum computed from the data being transmitted. In one exemplary embodiment, the color measurement readings sent to the interface device 104 are 32-bit values, although alternative embodiments can use other value lengths. The number of bits can depend on various factors, such as, for example, the counter length supported by the timer, the clock rate used for counting (e.g., typically, a faster clock would require more bits and be more accurate but would consume more power), and the maximum amount of time needed for each measurement (which in turn can depend on the type of light sensor and related circuitry). The data transmission may be initiated, for example, automatically by the color capture device 102 (e.g., a predetermined amount of time after completion of the color measurement sequence, or a predetermined amount of time after detecting light that signifies removal of the color capture device from the customer's skin or placement of the color capture device onto the screen of the interface device 104) or by the user operating the switch (S1) again (e.g., a short actuation of the switch causing initiation of the color measurement sequence and a long actuation of the switch causing initiation of transmission).

Firmware including computer code for taking color measurements and transmitting color measurement information to the interface device 104 in accordance with the processes described above is stored in the microcontroller (U1). In an exemplary embodiment, the firmware controls the LEDs (i.e., turning the LEDs on and off) through internal registers of the microcontroller, and specifically through register bits associated with pins RC2-RC0. The following table shows bitmapped settings for control of the LEDs by the firmware in accordance with an exemplary embodiment:

|  | RC2 (blue) | RC1 (green) | RC0 (red) |
| --- | --- | --- | --- |
| All LEDs off | 0 | 0 | 0 |
| Blue LED on | 1 | 0 | 0 |
| Green LED on | 0 | 1 | 0 |
| Red LED on | 0 | 0 | 1 |

It should be noted that alternative embodiments additionally or alternatively can be configured to take measurements with combinations of LEDs on, e.g., blue+green, blue+red, green+red, and/or blue+green+red. The following table shows bitmapped settings for control of the LEDs by the firmware in accordance with an alternative embodiment:

|  | RC2 (blue) | RC1 (green) | RC0 (red) |
| --- | --- | --- | --- |
| All LEDs off | 0 | 0 | 0 |
| Blue LED on | 1 | 0 | 0 |
| Green LED on | 0 | 1 | 0 |
| Red LED on | 0 | 0 | 1 |
| Blue + Green on | 1 | 1 | 0 |
| Blue + Red on | 1 | 0 | 1 |
| Green + Red on | 0 | 1 | 1 |
| All LEDs on | 1 | 1 | 1 |

It should be noted that alternative embodiments can include a three-color RGB LED in place of the three separate red, green, and blue LEDs. A three-color RGB LED generally would be controlled in a manner similar to color of the three separate LEDs, e.g., using three microcontroller output pins allowing for the eight output settings described in the table above.

It should be noted that alternative embodiments can include one or more additional LEDs, such as, for example, a white LED, a yellow LED, etc. Measurements can be taken with the additional LEDs such as for gathering additional skin color measurements.

One issue is that different color capture devices can have different performance characteristics, e.g., differences in the LED colors, differences in LED intensities, differences in LED intensity measurements, different battery-specific performance, etc. These differences can lead to errors in skin color characterization and generation of the custom cosmetics recipe. Thus, in some exemplary embodiments, each color capture device 102 can be calibrated (e.g., to characterize the LED colors and/or LED intensity values). Calibration data can be stored in the color capture device 102, in which case the calibration data can be transmitted to the interface device 104, e.g., along with the color measurement readings or separately from the color measurement readings. Alternatively, the calibration data can be stored elsewhere (e.g., in the server system 106). In any case, the calibration data can be made available to the interface device 104, the server system 106, and/or the mixing/dispensing machine 108 for use in producing the custom cosmetics recipe, allowing the process to account for differences across color capture devices. For example, if the calibration data includes LED color calibration data (e.g., specifying the actual wavelength of each LED in a particular color capture device), then the process for producing the custom cosmetics recipe can use the actual LED color calibration data rather than the nominal LED color information (i.e., 470 nm blue, 520 nm green, 625 nm red) in order to produce a more accurate and consistent color match. In this respect, the unique color capture device identifier can be used to correlate the color capture device with the corresponding calibration data, e.g., in order to retrieve calibration data from a server or memory.

Another issue is that LED intensity can change based on the battery level. Specifically, the LED intensity tends to drop as the battery level drops. These differences can lead to errors in skin color characterization and generation of the custom cosmetics recipe.

In some exemplary embodiments, the color capture device 102 can include a battery voltage meter to measure and record the battery voltage associated with a given color measurement sequence. The battery voltage measurement can be used by the color capture device to adjust the color measurement readings, or the battery voltage measurement can be transmitted to the interface device 104, e.g., along with the color measurement readings or separately from the color measurement readings. The battery voltage measurement can be made available to the interface device 104, the server system 106, and/or the mixing/dispensing machine 108 for use in producing the custom cosmetics recipe, allowing the process to account for battery-dependent changes in LED intensity.

In various alternative embodiments, the color capture device 102 additionally or alternatively can include a voltage regulator in order to regulate the voltage applied to the LEDs across a range of battery voltages. Such embodiments would tend to reduce or eliminate battery-dependent changes in LED intensity, but at the expense of greater power consumption (i.e., reduced battery life).

In various alternative embodiments, the customer may be prompted to capture a known color sample (e.g., a color sample provided with the color capture device, or a dark measurement). This reference color capture information can be used by the color capture device 102 or transmitted to the interface device 104, e.g., along with skin color measurement readings or separately from skin color measurement readings. The reference color capture information can be made available to the interface device 104, the server system 106, and/or the mixing/dispensing machine 108 for use in producing the custom cosmetics recipe, allowing the process to account for device-specific performance (e.g., LED colors, battery-dependent changes in LED intensity, etc.).

Generally speaking, after completion of the color measurement sequence, the color capture device 102 compiles a data transmission message to send to the interface device 104. As discussed above, the data transmission message typically includes the three color measurement readings and may include other information, such as, for example, a unique color capture device identifier that is pre-stored in the color capture device 102 and a checksum computed from the data being transmitted. In some embodiments, the data transmission message may include additional information, such as, for example, calibration data, a battery voltage measurement, and/or reference color capture information. The data transmission message is transmitted via the loop antenna to the interface device 104.

In exemplary embodiments, the loop antenna effectively has three possible data transmission states that can be represented as +1 (e.g., a positive current in the loop antenna), 0 (e.g., no current in the loop antenna), and −1 (e.g., a negative current in the loop antenna). The data being transmitted to the interface device 104 can be encoded and transmitted using these data transmission states.

In one exemplary embodiment, the data to be transmitted from the color capture device 102 to the interface device 104 is encoded using a Non-Return to Zero Inverted (NRZI) encoding scheme as known in the art, although other encoding schemes can be used in various alternative embodiments (e.g., F2F or other encoding schemes). The present invention is not limited to any particular encoding scheme.

In one exemplary embodiment, the encoded data is transmitted using only the +1 and −1 states, where the +1 state is used to represent a logic "1" (e.g., a mark bit) and the −1 state is used to represent a logic "0" (e.g., a space bit). Some alternative embodiments can employ binary transmission schemes using the +1 and 0 states or the −1 and 0 states. Yet other alternative embodiments can employ trinary transmission schemes using all three states. In any case, the transmission typically begins with an identifiable start sequence (e.g., two consecutive mark bits), allowing the interface device 104 to identify the start of the transmission and typically also to determine the transmit clock rate (i.e., the rate at which bits are transmitted by the color capture device 102). In an exemplary embodiment, transmission from the color capture device 102 to the interface device 104 includes two copies of the data in order to improve the chances of the data being received by the interface device 104 (e.g., by transmitting the data transmission message twice), although alternative embodiments can transmit just one copy of the data or can use other schemes to improve reliability (e.g., including parity or forward error correction information in the data transmission message in addition to, or in lieu of, a checksum). In one alternative embodiment, when the customer operates the switch (S1), the color capture device 102 can be configured to transmit the last data captured by the color capture device 102, initiate a new color measurement sequence, and store the results of the new color measurement sequence for transmission when the customer next operates the switch (S1). The present invention is not limited to any particular transmission or error detection/correction schemes.

While exemplary embodiments are discussed above in the context of capturing a customer's skin color, it should be noted that exemplary embodiments are not limited to skin color measurements but instead can be used to capture color measurements from virtually any type of surface (e.g., to match cosmetics to an outfit).

Figure 11:
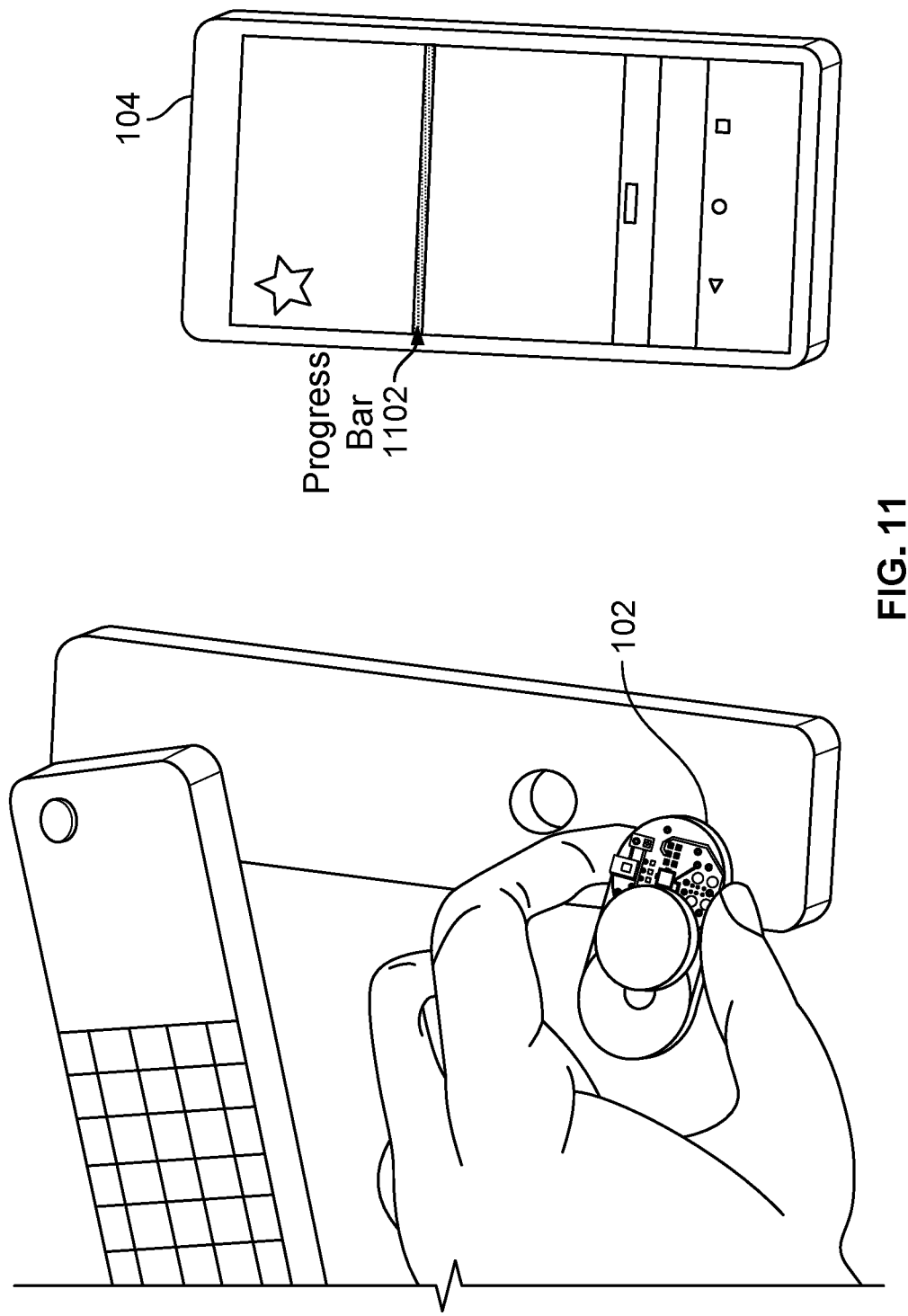
Figure 12:
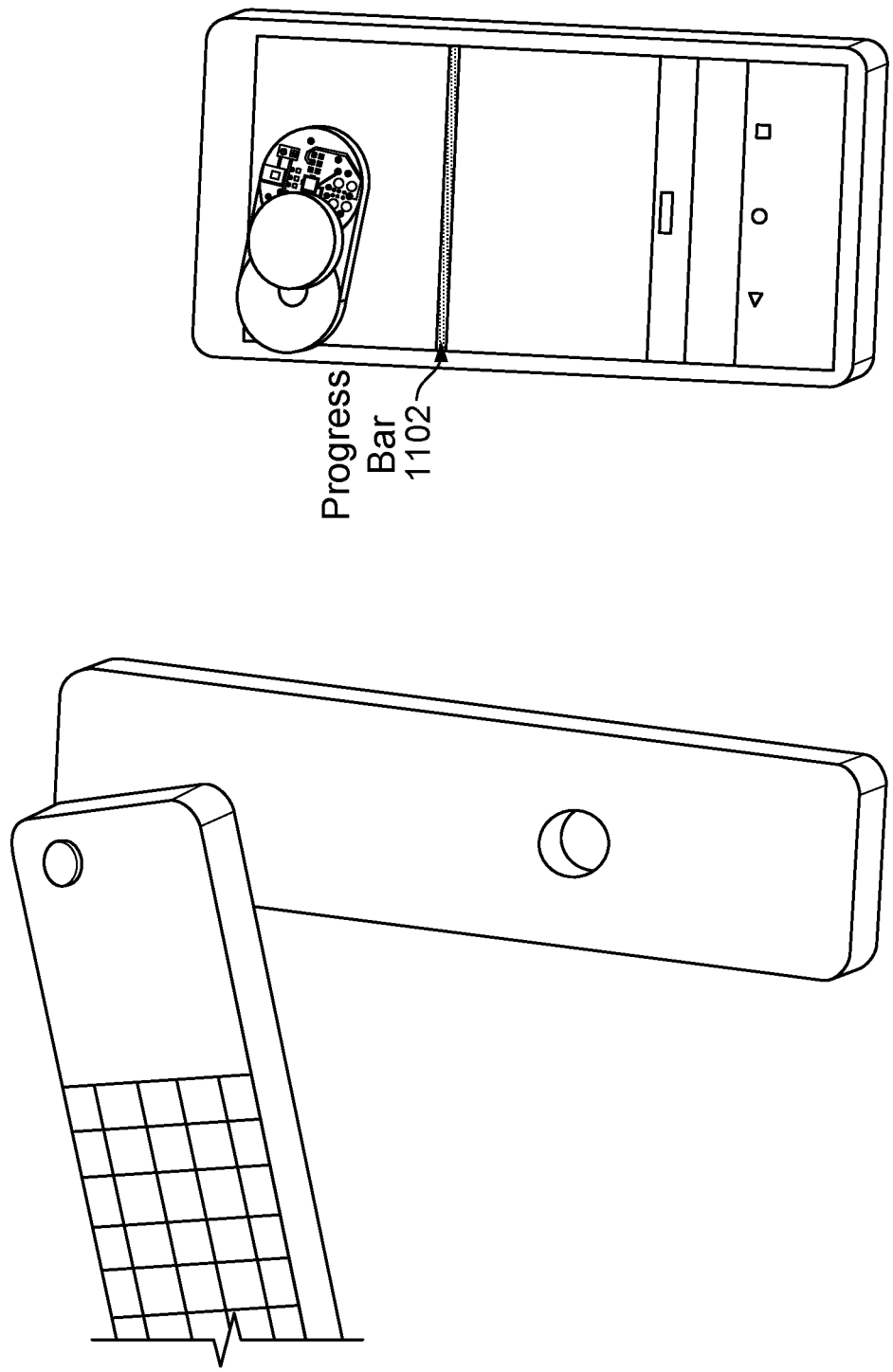

In an exemplary embodiment, the color capture device 102 and the interface device 104 are configured so that the customer can initiate a color measurement sequence and then have the data transmitted to the interface device 104 simply by placing the color capture device 102 on or in close proximity to the interface device 104. FIGS. 11-14 are photographs demonstrating a color capture process in accordance with an exemplary embodiment. In FIG. 11, the interface device 104 is running an "app". The customer presses the RESET control on the graphical user interface in order to place the "app" in a waiting state in which the "app" is monitoring for a transmission from the color capture device 102. The customer places the color capture device on a portion of skin or other surface to be measured (in this example, a paint color sample) and initiates the color measurement sequence, e.g., by operating the switch (S1). When the color measurement sequence is complete, the customer places the color capture device 102 on the screen of the interface device 104, as shown in FIG. 12. The color capture device 102 begins transmitting the data to the interface device 104, e.g., upon the customer operating the switch (S1), or automatically by the color capture device 102, e.g., after a predetermined amount of time or upon detecting light from the display screen of the interface device 104. The "app" on the interface device 104 displays a progress indicator (in this example, a progress bar 1102) to show the progress of receiving the transmission from the color capture device 102. FIG. 12 shows progress toward the beginning of the transmission. FIG. 13 shows progress toward the end of the transmission. FIG. 14 shows a sample screen upon completion of the transmission. Here, the "app" determines the captured color using the wavelength and intensity information for the three LEDs and displays information about the captured color including a display of the color and display of a numerical identifier for the color.

Figure 15:
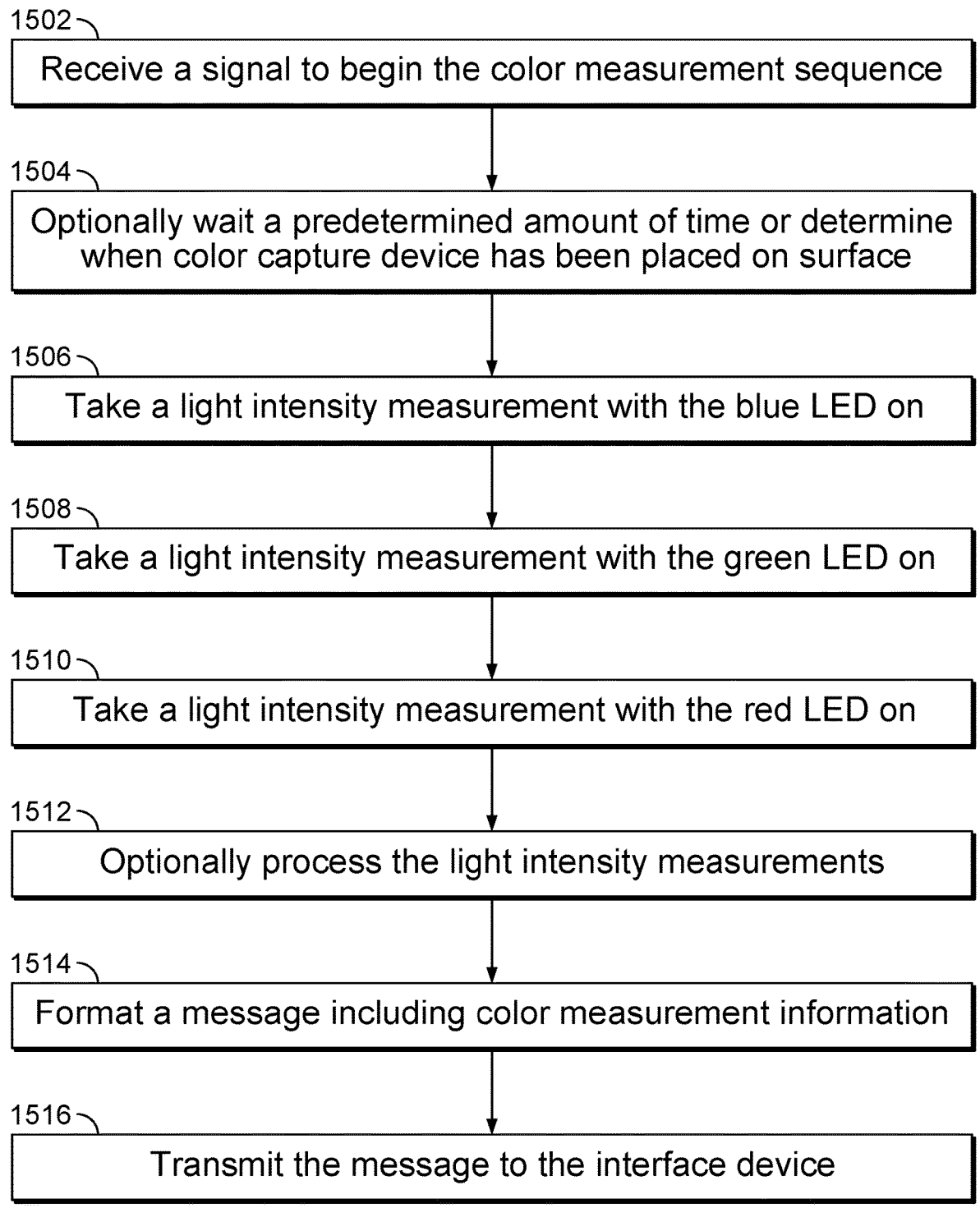
FIG. 15 is a schematic diagram for the firmware taking color measurements and transmitting color measurement information to the interface device 104, in accordance with an exemplary embodiment.

FIG. 15 is a schematic diagram for the firmware taking color measurements and transmitting color measurement information to the interface device 104, in accordance with an exemplary embodiment. In block 1502, the firmware receives signal to begin color measurement sequence such as from the switch (S1). In block 1504, the firmware optionally waits a predetermined amount of time or determines when the color capture device has been placed on a surface to be measured. In block 1506, the firmware takes a light intensity measurement with the blue LED on. In block 1508, the firmware takes a light intensity measurement with the green LED on. In block 1510, the firmware takes a light intensity measurement with the red LED on. It should be noted that blocks 1506, 1508, and 1510 can be performed in any order. In block 1512, the firmware optionally processes the light intensity measurements, e.g., to produce a characterization of the captured color (although such processing typically is done in the interface device 104 or server system 106 in exemplary embodiments). In block 1514, the firmware formats a message including color measurements information and optionally other information such as a color capture device identifier. In block 1516, the firmware transmits the message to the interface device 104 via the loop antenna. As discussed above, in an exemplary embodiment, the firmware controls the LEDs by controlling corresponding output pins on the microcontroller. Similarly, the firmware transmit the message by controlling corresponding output pins on the microcontroller, e.g., to selectively produce a positive current, a negative current, or no current in the loop antenna.

Figure 16:
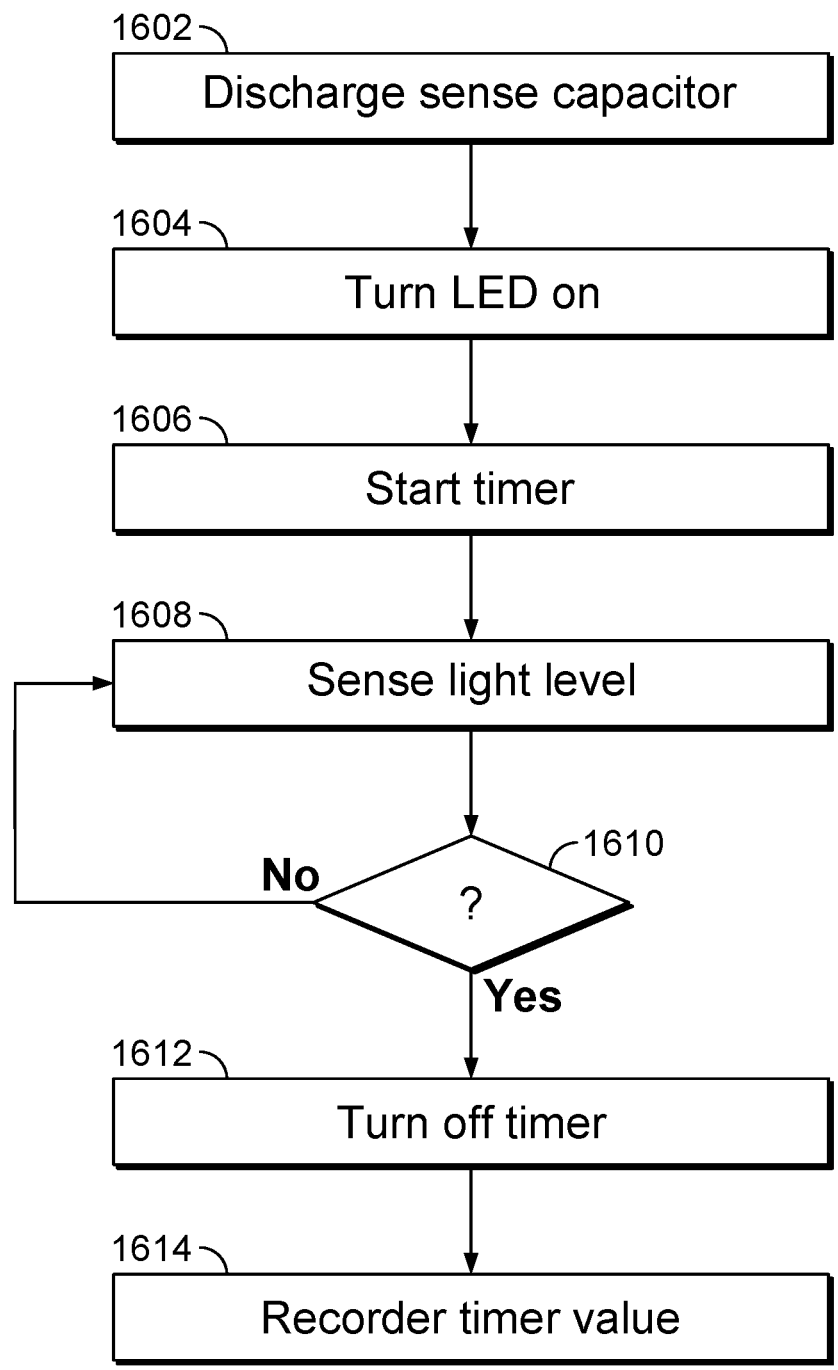
FIG. 16 is a schematic diagram for the firmware taking a color measurement for a given LED such as in blocks 1506, 1508, and 1510 of FIG. 15, in accordance with an exemplary embodiment.

FIG. 16 is a schematic diagram for the firmware taking a color measurement for a given LED such as in blocks 1506, 1508, and 1510 of FIG. 15, in accordance with an exemplary embodiment. In block 1602, the firmware discharges the sense capacitor. In block 1604, the firmware turns on the LED. In block 1606, the firmware starts the timer. In block 1608, the firmware senses the light level from the light sensor. In block 1610, the firmware determines if the light level from the light sensor has reached a predetermined light level. If the light level from the light sensor has not reached the predetermined light level (NO in block 1610), then the firmware returns to block 1608 to continue sensing. If, however, the light level from the light sensor has reached the predetermined light level (YES in block 1610), then the firmware turns off the timer in block 1612 and records the timer value in block 1614.

In certain embodiments, the "app" on the interface device 104 can be configured to notify the customer when the battery in the color capture device 102 is low. For example, in certain embodiments discussed above, the color capture device 102 transmits a battery voltage measurement to the interface device 104, and the interface device 104 can display battery level information to the customer. In other embodiments, the "app" can infer battery level information, for example, based on the quality of the signal received from the color capture device 102 (e.g., if the signal is weak or contains errors, then an inference might be drawn that the battery in the color capture device 102 is running low).

In the exemplary embodiments discussed above, communication from the color capture device 102 to the interface device 104 is via electromagnetic signals, e.g., transmitted by a loop antenna in the color capture device 102 and received by a magnetometer in the interface device 104. Alternative embodiments may use other inexpensive transmission schemes. For example, since the color capture device 102 includes LEDs that can be selectively controlled by the microcontroller, alternative embodiments can transmit data using one or more of the LEDs (e.g., flashing an LED on and off to convey encoded data) and using a camera or other light sensor in the interface device 104 to receive and decode the transmission.

U.S. Pat. No. 9,858,685, which is hereby incorporated herein by reference in its entirety, describes various techniques for processing color information, optionally performing after-sample adjustment of the color information, generating a custom cosmetics recipe from the captured and optionally adjusted color information, and producing the customized cosmetic from the custom cosmetics recipe. The described techniques generally can be used in embodiments of the present invention.

For example, the custom cosmetics recipe can be generated by mapping RGB color values (e.g., the intensity values from the color capture device 102 and the LED wavelengths) to a CIE L a*b* color space, retrieving CIE L a*b* coordinates for each of a plurality of stored color recipes from a memory, and identifying a closest match between the mapped RGB color values and a stored color recipe. In certain embodiments, either before or after mapping the RGB color values to the CIE L a*b* color space, the color values to be used for matching may be altered based on user inputs and/or automatically by the system, such as to adjust the color of the customized cosmetic in accordance with user preferences, regional purchase trends, ethnic purchase trends, current fashion trends, intended use (e.g., daylight vs. nighttime use), seasonality (e.g., darker in winter and lighter in summer, or vice versa), personal traits of the customer (e.g., hair color, eye color, etc.), or other adjustment. It should be noted that the custom cosmetics recipe can incorporate other additives, such as, for example, coverage reduction additives, finish additives, UV protective ingredients, moisturizers, vitamins, or other skincare ingredients. The various steps in the process of generating the custom cosmetics recipe can be performed by a single device or by a combination of devices among the color capture device 102, the interface device 104, the server system 106, and the mixing/dispensing machine 108.

Also, the customized cosmetic can be produced by converting the custom cosmetics recipe into displacements for actuators in the mixing/dispensing machine 108 that dispense various cosmetics additives, e.g., using a syringe pump or other pump for each additive. The custom cosmetics recipe, which typically consists of ratios of additives, as well as an intended total final volume, are typically provided to the dispensing/mixing machine 108, which calculates the required operation of the actuators. Dispense control electronics in the missing/dispensing machine 108 operate the actuators that result in dispensing of product. Depending on the custom cosmetics recipe, some additives may not be included in the final product. Therefore, some actuator displacements may calculate to zero such that the corresponding actuator(s) receive zero displacement by the dispense control electronics. In embodiments where one or more additional actuators are used for mixing of the dispensed additives, the mix control electronics also operate the mix actuator(s).

Similarly, color capture devices of the type described herein can be used in the systems described in U.S. Pat. No. 9,858,685. Rather than using the mobile device camera and special lens assembly to capture color, the color capture device 102 can pass color measurements and other information to the mobile device (where the mobile device essentially corresponds to the interface device 104 described herein). Once color information from the color capture device is received by the mobile device, processing can occur substantially as described in U.S. Pat. No. 9,858,685 to characterize the color, generate a custom cosmetics recipe, and produce the customized cosmetic.

The processing logic of the present invention (e.g., processing logic operating on the color capture device and processing logic operating on the interface device) may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses.

While various embodiments have been described by process steps, an apparatus comprising a computer with associated display capable of executing the process steps is also included in the present invention. Likewise, a computer program product including computer executable instructions for executing the process steps and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A color capture device for use in characterizing color of a surface, the color capture device comprising:
   at least one LED capable of selectively producing red light, green light, and blue light;
   a light sensor circuit;
   a loop antenna; and
   a microcontroller having a timer circuit, the microcontroller comprising stored computer program instructions that, when executed on the microcontroller, causes the microcontroller to implement computer processes for a color capture sequence, the computer processes comprising:
   controlling at least one output pin on the microcontroller to produce the blue light from the at least one LED to illuminate the surface with the blue light;
   using the light sensor circuit and the timer circuit to take a blue light intensity measurement of the blue light reflected off of the surface with the blue light on including by measuring an amount of time for cumulative blue light intensity to reach a predetermined blue light level;
   controlling at least one output pin on the microcontroller to produce the green light from the at least one LED to illuminate the surface with the green light;
   using the light sensor circuit and the timer circuit to take a green light intensity measurement of the green light reflected off of the surface with the green light on including by measuring an amount of time for cumulative green light intensity to reach a predetermined green light level;
   controlling at least one output pin on the microcontroller to produce the red light from the at least one LED to illuminate the surface with the red light;
   using the light sensor circuit and the timer circuit to take a red light intensity measurement of the red light reflected off of the surface with the red light on including by measuring an amount of time for cumulative red light intensity to reach a predetermined red light level;
   formatting a message including color measurement information derived from the light intensity measurements; and
   controlling at least one output pin on the microcontroller to transmit the message electromagnetically using the loop antenna.

2. The color capture device of claim 1, wherein the at least one LED includes separate red, green, and blue LEDs.

3. The color capture device of claim 2, further comprising:
   a first resistor coupled to the blue LED;
   a second resistor coupled to the green LED; and
   a third resistor coupled to the red LED, wherein the resistors are selected so that the LEDs have substantially equal intensities.

4. The color capture device of claim 1, wherein the at least one LED includes a three-color red-green-blue LED.

5. The color capture device of claim 1, wherein using the light sensor circuit and the timer circuit to take a light intensity measurement comprises:
   measuring the light intensity after a predetermined amount of time.

6. The color capture device of claim 1, wherein controlling at least one output pin on the microcontroller to transmit the message electromagnetically using the loop antenna comprises:
   controlling the at least one output pin to produce binary transmission signals.

7. The color capture device of claim 1, wherein controlling the at least one output pin to produce binary transmission signals comprises:
   controlling the at least one output pin to produce a positive current in the loop antenna to transmit a first transmission state; and
   controlling the at least one output pin to produce a negative current in the loop antenna to transmit a second transmission state.

8. The color capture device of claim 1, wherein controlling at least one output pin on the microcontroller to transmit the message electromagnetically using the loop antenna comprises:
   controlling the at least one output pin to produce trinary transmission signals.

9. The color capture device of claim 1, wherein the light sensor circuit includes a phototransistor.

10. The color capture device of claim 1, wherein the light sensor circuit includes a photodiode.

11. The color capture device of claim 1, wherein the light sensor circuit includes a light sensor and a capacitor, the light sensor has an output coupled to charge the capacitor, and the capacitor is coupled to an input pin of the microcontroller.

12. The color capture device of claim 11, wherein using the light sensor circuit and the timer circuit to take a light intensity measurement comprises:
   measuring the capacitor charge after a predetermined amount of time.

13. The color capture device of claim 12, further comprising an analog-to-digital converter, wherein measuring the capacitor charge after a predetermined amount of time comprises:
   using the analog-to-digital converter to convert the capacitor charge to a digital value.

14. The color capture device of claim 1, wherein the computer processes further comprise:
   waiting a predetermined amount of time after taking the light intensity measurements before controlling at least one output pin on the microcontroller to transmit the message electromagnetically using the loop antenna.

15. The color capture device of claim 1, wherein the computer processes further comprise:
   using the light sensor circuit to detect a light level below a predetermined threshold before controlling at least one output pin on the microcontroller to transmit the message electromagnetically using the loop antenna.

16. The color capture device of claim 1, wherein the computer processes further comprise:
   receiving a user input before controlling at least one output pin on the microcontroller to transmit the message electromagnetically using the loop antenna.

17. The color capture device of claim 1, further comprising a switch having an output coupled to the microcontroller, wherein the computer processes further comprise:
   monitoring for user operation of the switch; and
   upon detecting user operation of the switch, initiating the color capture sequence.

18. The color capture device of claim 1, further comprising a switch having an output coupled to the microcontroller, wherein the computer processes further comprise:
   monitoring for user operation of the switch; and upon detecting user operation of the switch, controlling at least one output pin on the microcontroller to transmit the message electromagnetically using the loop antenna.

19. A color capture device for use in characterizing color of a surface, the color capture device comprising:

at least one LED capable of selectively producing red light, green light, and blue light;

a light sensor circuit including a light sensor and a capacitor, wherein the light sensor has an output coupled to charge the capacitor and the capacitor is coupled to an input pin of a microcontroller;

a loop antenna; and the microcontroller having a timer circuit, the microcontroller comprising stored computer program instructions that, when executed on the microcontroller, causes the microcontroller to implement computer processes for a color capture sequence, the computer processes comprising:

controlling at least one output pin on the microcontroller to produce the blue light from the at least one LED to illuminate the surface with the blue light;

using the light sensor circuit and the timer circuit to take a blue light intensity measurement of the blue light reflected off of the surface with the blue light on including by measuring an amount of time for the capacitor charge to reach a predetermined level;

controlling at least one output pin on the microcontroller to produce the green light from the at least one LED to illuminate the surface with the green light;

using the light sensor circuit and the timer circuit to take a green light intensity measurement of the green light reflected off of the surface with the green light on including by measuring an amount of time for the capacitor charge to reach a predetermined level;

controlling at least one output pin on the microcontroller to produce the red light from the at least one LED to illuminate the surface with the red light;

using the light sensor circuit and the timer circuit to take a red light intensity measurement of the red light reflected off of the surface with the red light on including by measuring an amount of time for the capacitor charge to reach a predetermined level;

formatting a message including color measurement information derived from the light intensity measurements; and controlling at least one output pin on the microcontroller to transmit the message electromagnetically using the loop antenna.

\* \* \* \* \*